(12) United States Patent
Kadota et al.

(10) Patent No.: US 11,986,728 B2
(45) Date of Patent: May 21, 2024

(54) GAME PROCESSING METHOD AND RECORD MEDIUM

(71) Applicant: Koei Tecmo Games Co., Ltd., Yokohama (JP)

(72) Inventors: Hitoshi Kadota, Yokohama (JP); Yusuke Ishihara, Yokohama (JP)

(73) Assignee: KOEI TECMO GAMES CO., LTD., Yokohama (JP)

(*) Notice: Subject to any disclaimer, the term of this patent is extended or adjusted under 35 U.S.C. 154(b) by 116 days.

(21) Appl. No.: 17/706,592

(22) Filed: Mar. 29, 2022

(65) Prior Publication Data

US 2022/0314114 A1 Oct. 6, 2022

(30) Foreign Application Priority Data

Mar. 31, 2021 (JP) .................. 2021-061671

(51) Int. Cl.
*G06F 3/0481* (2022.01)
*A63F 13/212* (2014.01)
*A63F 13/428* (2014.01)
*A63F 13/65* (2014.01)
(Continued)

(52) U.S. Cl.
CPC .......... *A63F 13/428* (2014.09); *A63F 13/212* (2014.09); *A63F 13/65* (2014.09); *G02B 27/017* (2013.01); *G02B 27/0179* (2013.01); *A63F 2300/8082* (2013.01); *G02B 2027/0187* (2013.01)

(58) Field of Classification Search
CPC ....... G06T 19/006; G06T 19/20; G06T 13/40; G06T 7/251; G06T 3/40; G06T 15/30; G06T 17/10; G06T 2207/20092; G06T 2207/20101; G06F 3/011; G06F 3/012; G06F 3/013; G06F 3/017; G06F 3/0346; G06F 3/04815; G06F 3/04842; G06F 3/04845; G06F 2111/18; A63F 13/20; A63F 13/56; A63F 13/57; A63F 13/577; A63F 13/63; A63F 13/65; A63F 2300/308; A63F 2300/6607; A63F 2300/6653; A63F 2300/69; A63F 2300/8082; A63F 2300/825

See application file for complete search history.

(56) References Cited

U.S. PATENT DOCUMENTS 10,551,993 B1 * 2/2020 Sanocki .................. G06F 3/017
2013/0335405 A1 * 12/2013 Scavezze ................ A63F 13/61
345/419

FOREIGN PATENT DOCUMENTS

JP 2015-231443 12/2015

* cited by examiner

*Primary Examiner* — Lawrence S Galka
(74) *Attorney, Agent, or Firm* — MORI & WARD, LLP

(57) ABSTRACT

A game processing method executed by an information processing device configured to perform transmission/reception of signals to/from a display part configured to be attachable to a head of a player to display a virtual image superimposed on an image in real space, the method includes causing the display part to display an image of a virtual object, adjusting at least one of a position or an orientation of the virtual object relative to the image in real space, based on an input of the player, causing the display part to display an image of a virtual game character so as to be arranged coinciding with the adjusted at least one of the position or the orientation of the virtual object, and hiding the image of the virtual object when the image of the game character is displayed.

20 Claims, 33 Drawing Sheets

(51) Int. Cl.
*G02B 27/01* (2006.01)
*G06F 3/0484* (2022.01)

[FIG. 1]
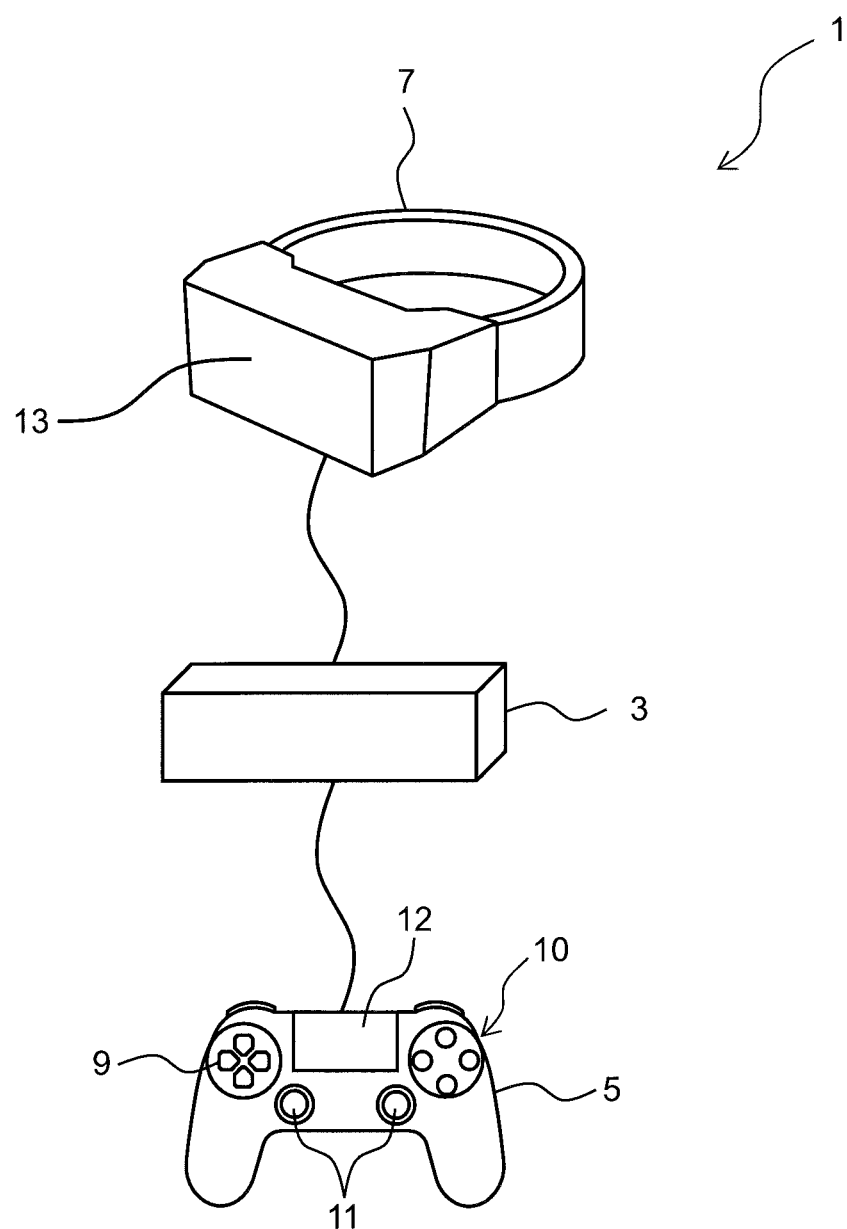

[FIG. 2]
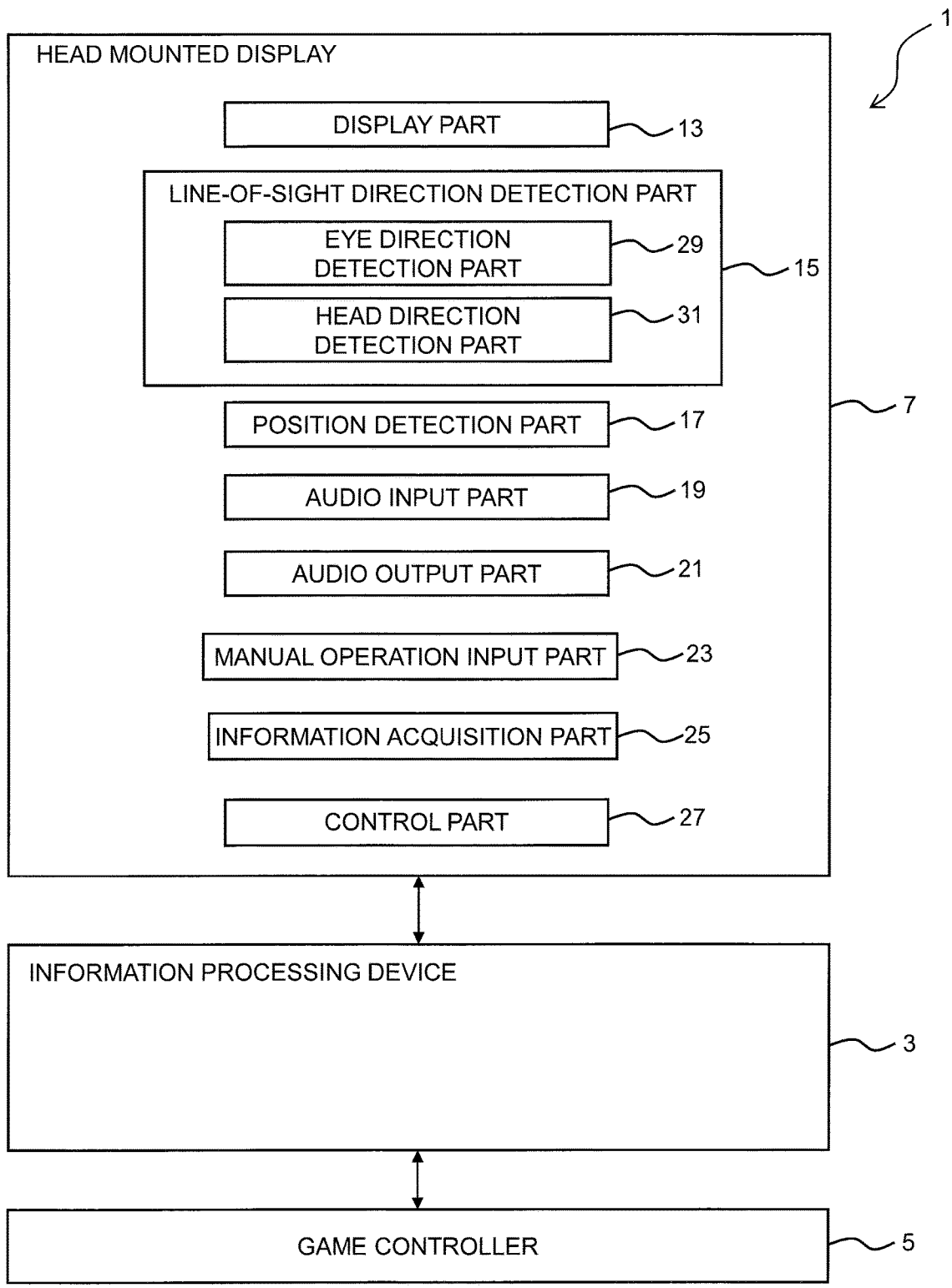

[FIG. 3]
TAP
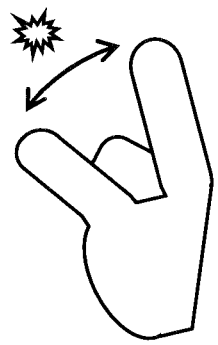
DOUBLE-TAP
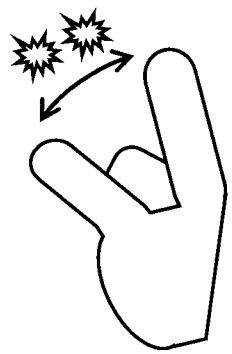
ROTATE
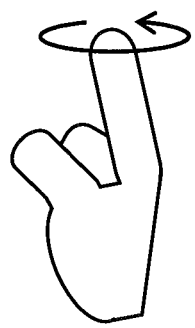

[FIG. 4]
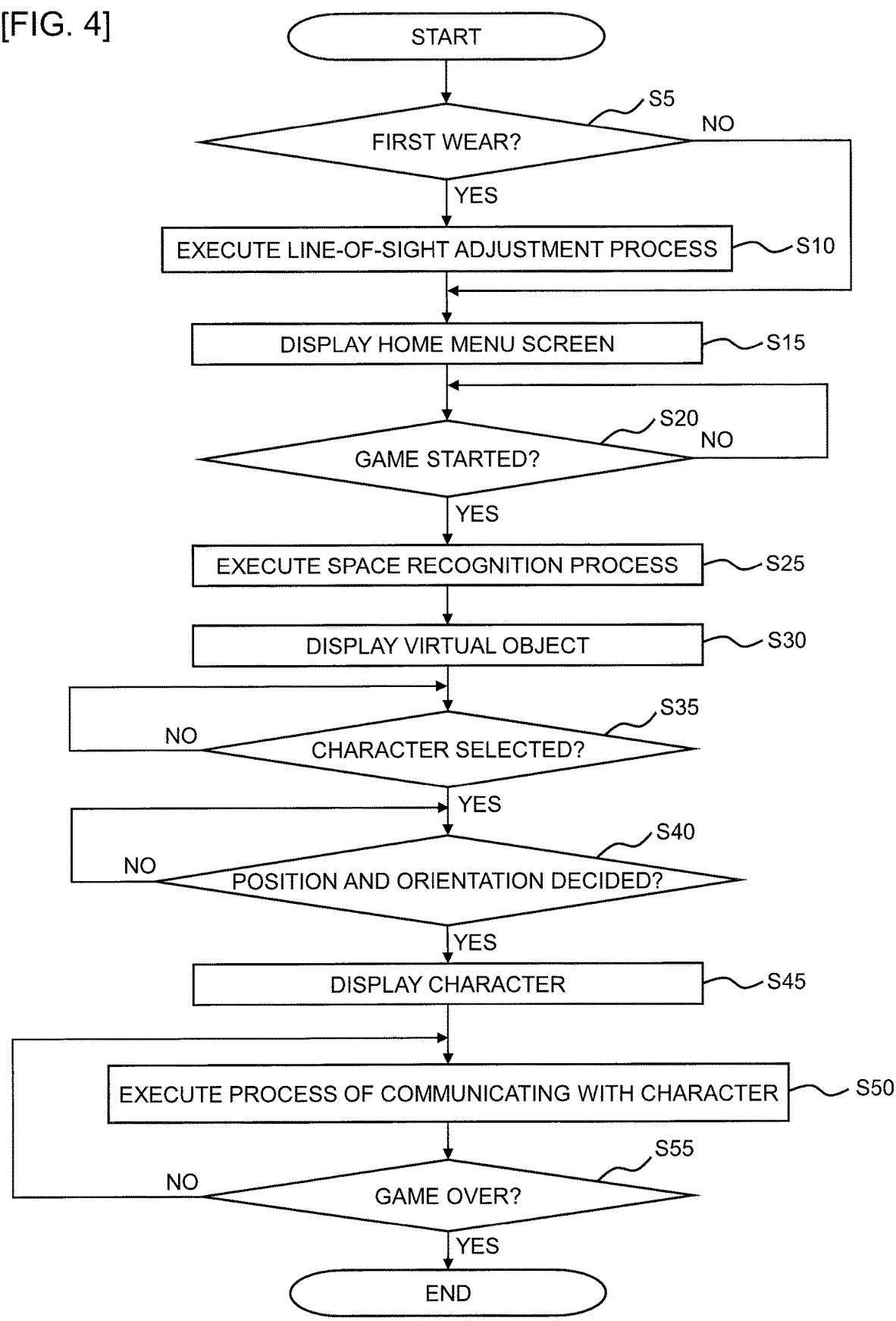

[FIG. 5]
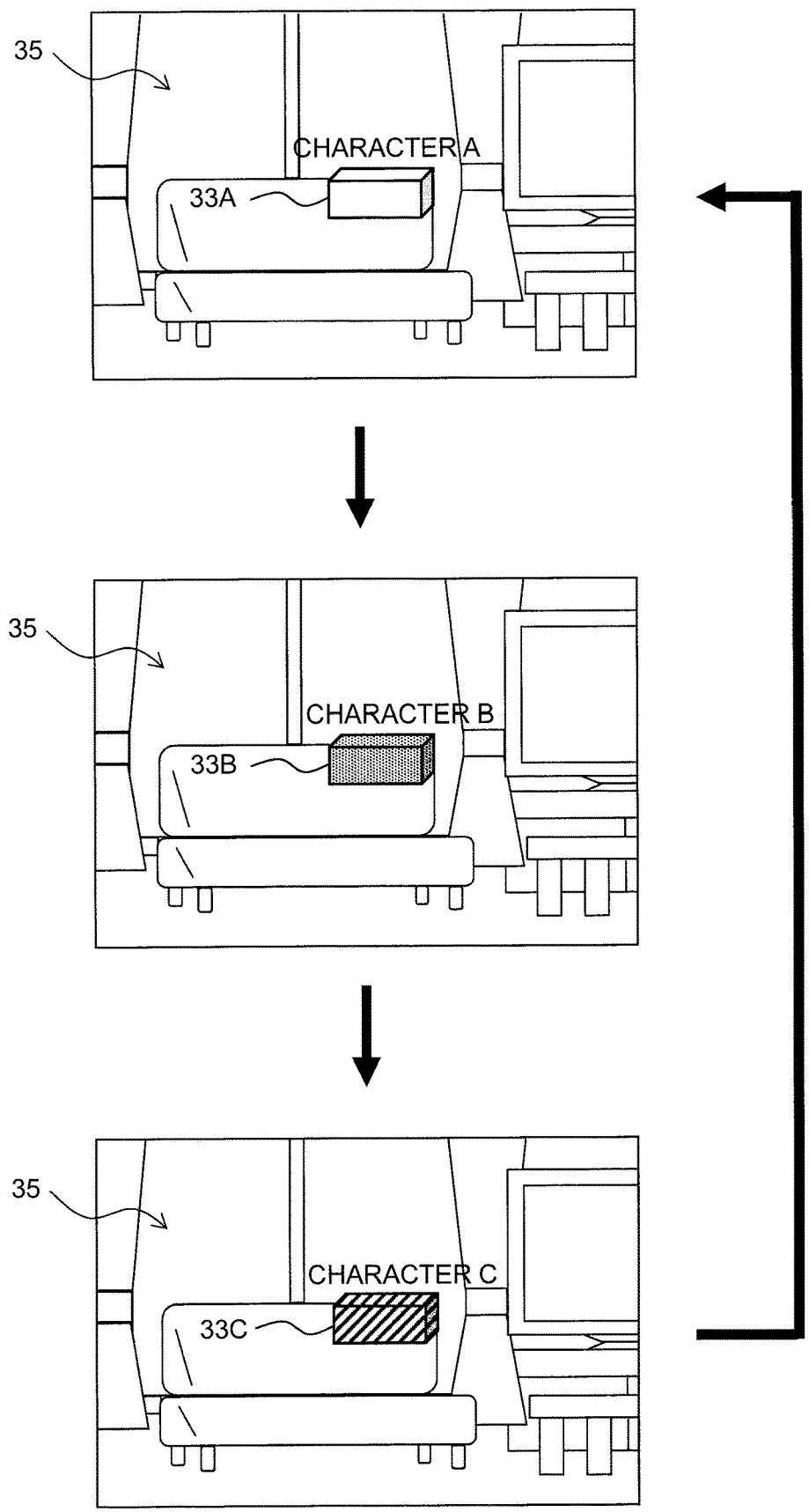

[ FIG. 6 ]
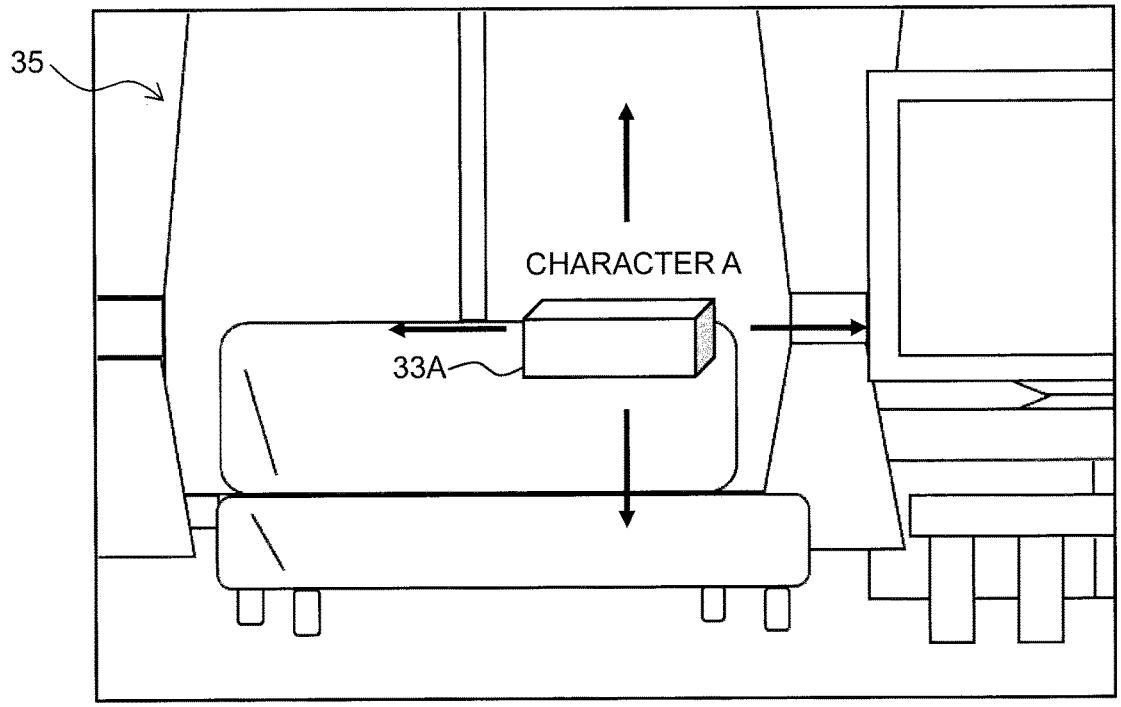
[ FIG. 7 ]
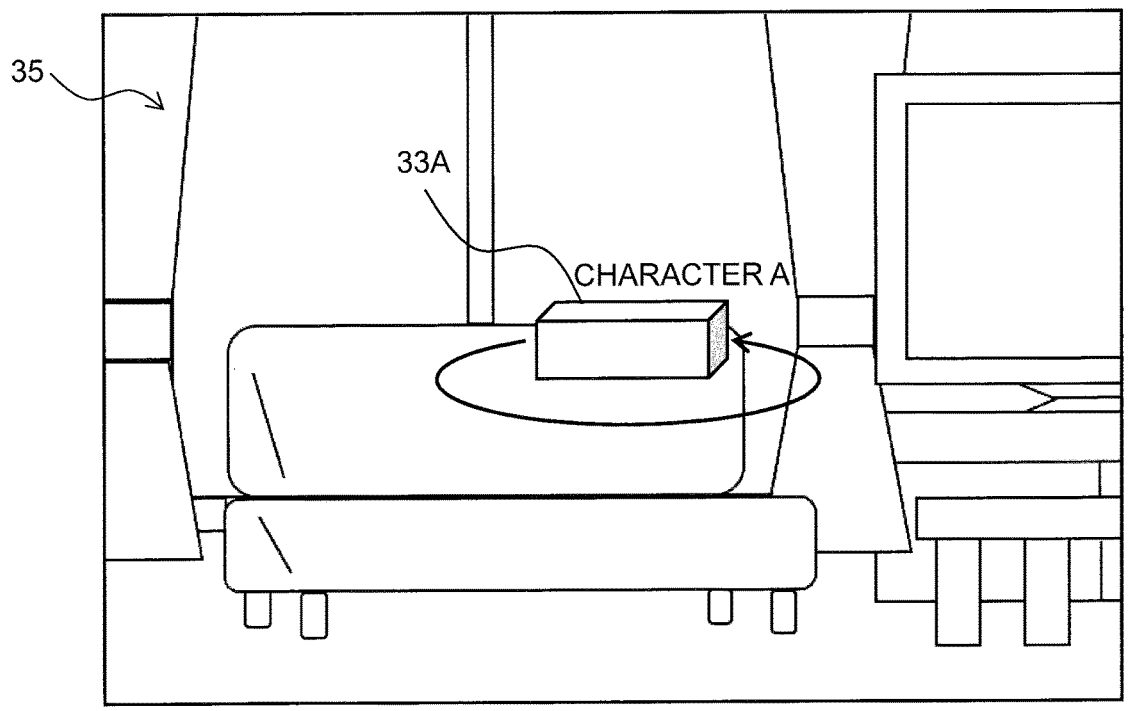

[FIG. 8]
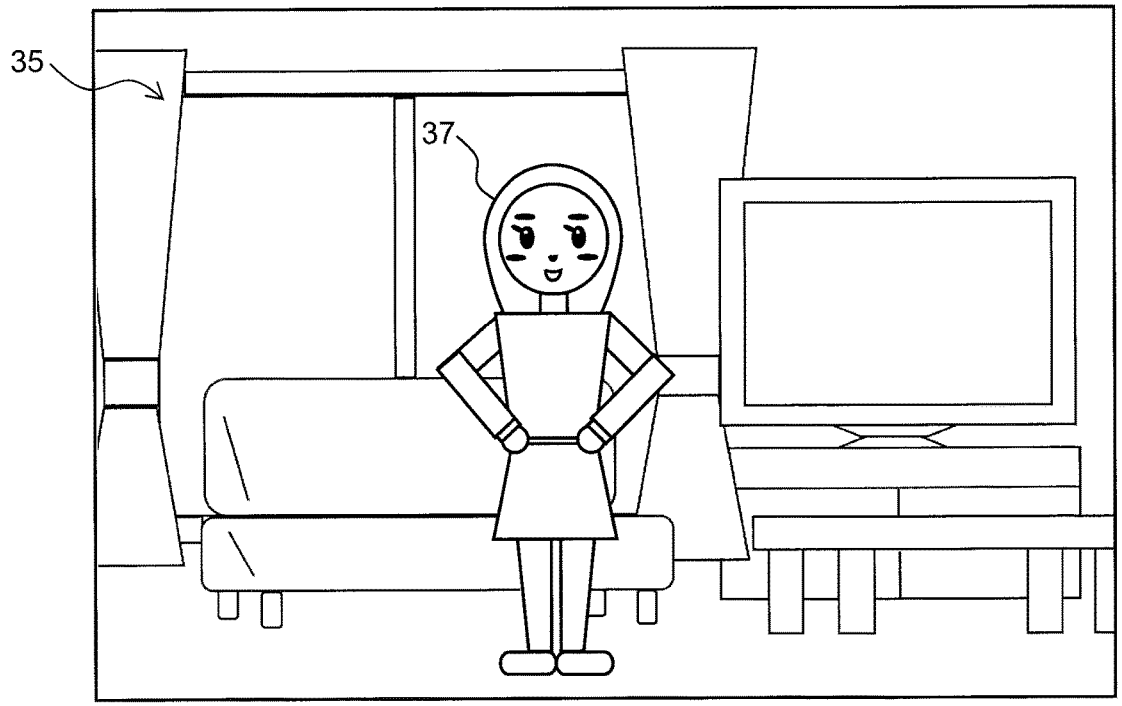
[FIG. 9]
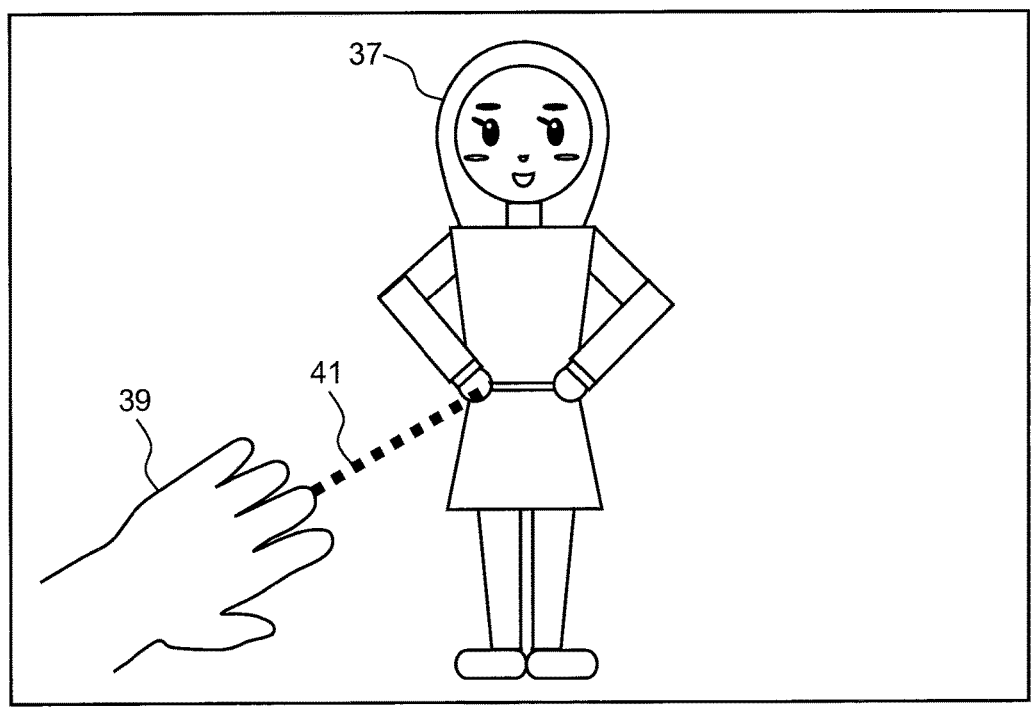

[FIG. 10]
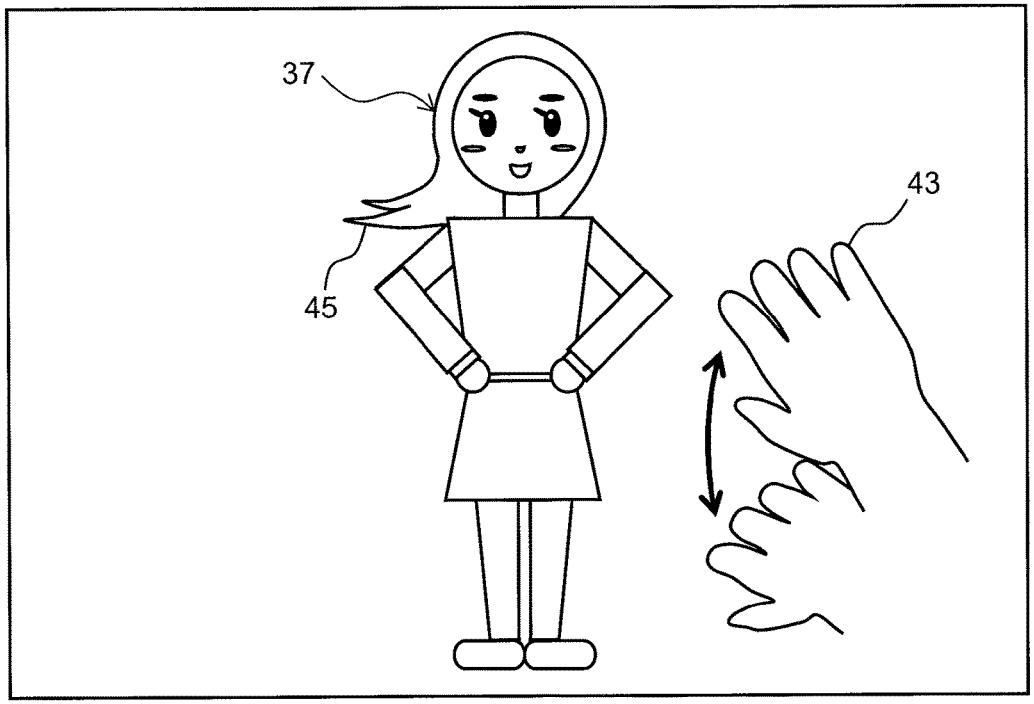
[FIG. 11]
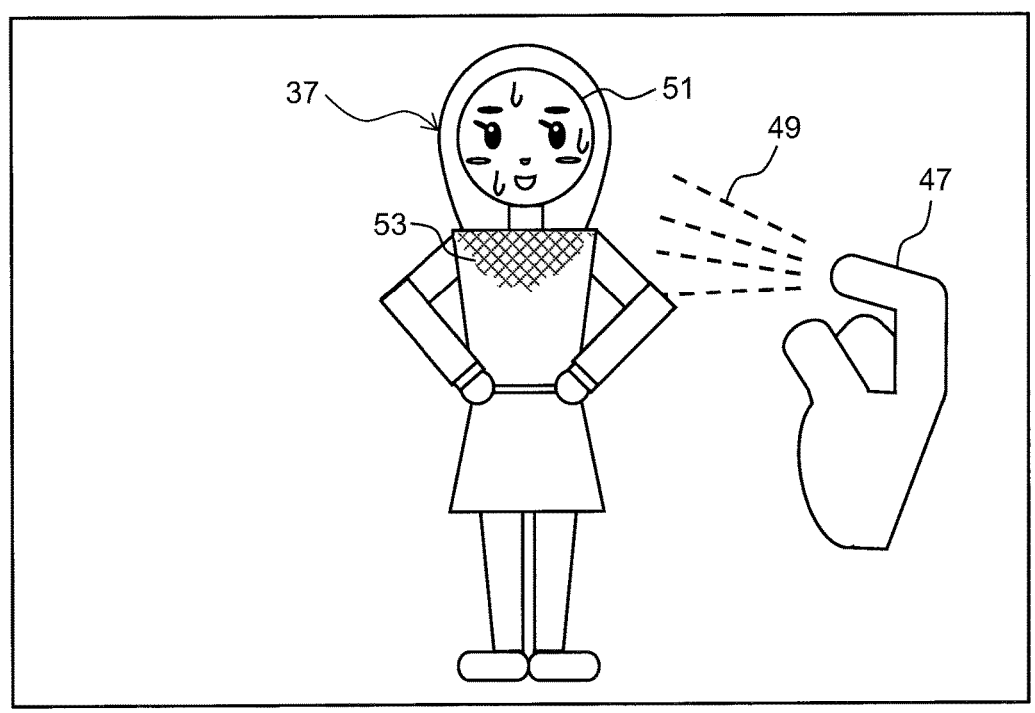

[FIG. 12]
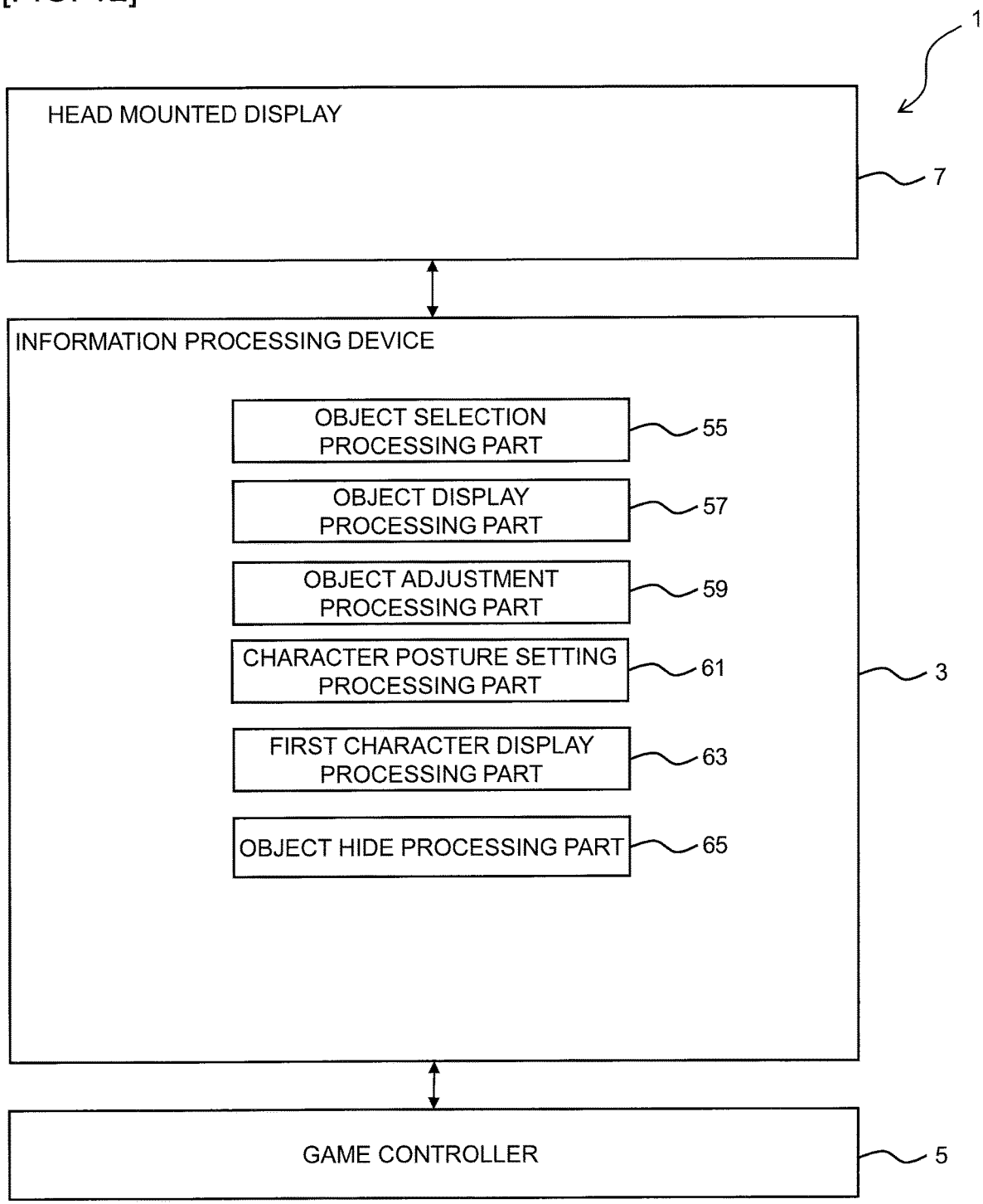

[FIG. 13]
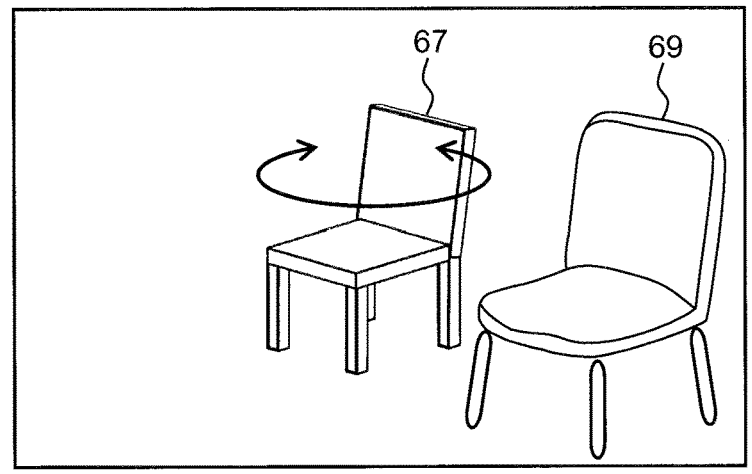
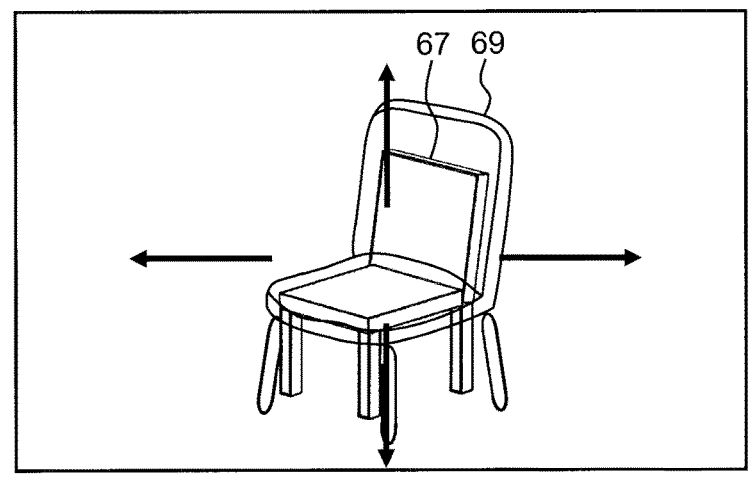
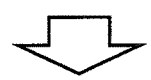
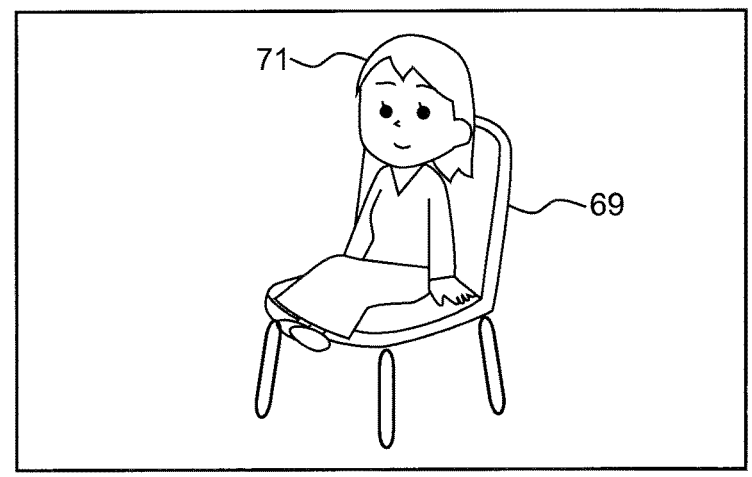

[FIG. 14]
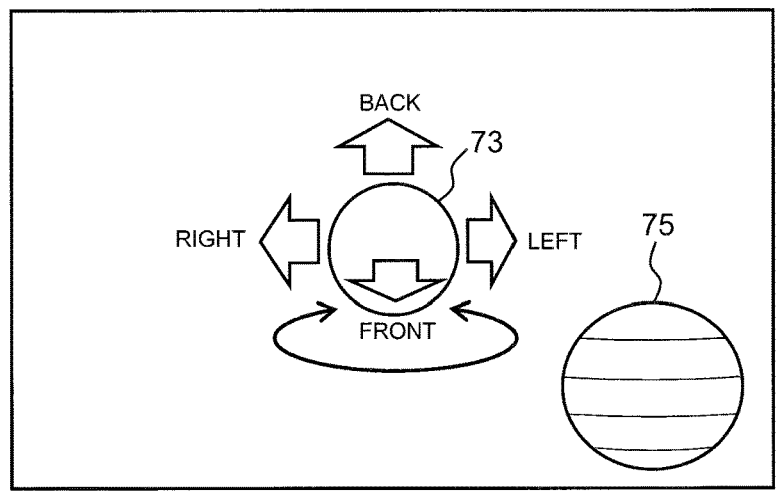
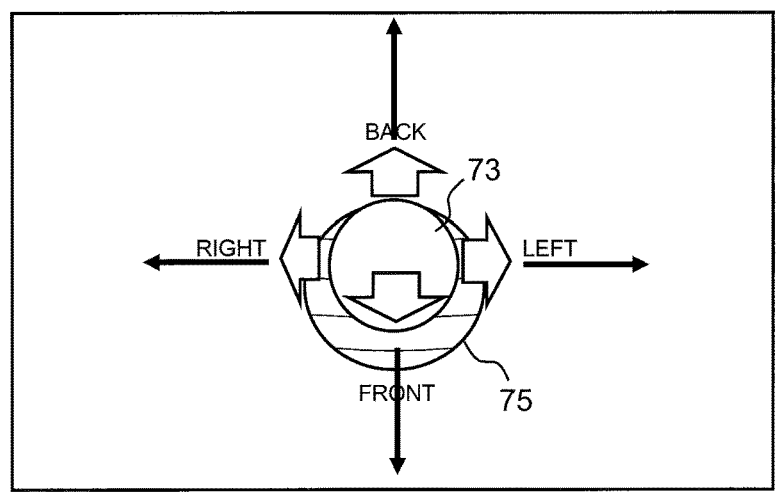
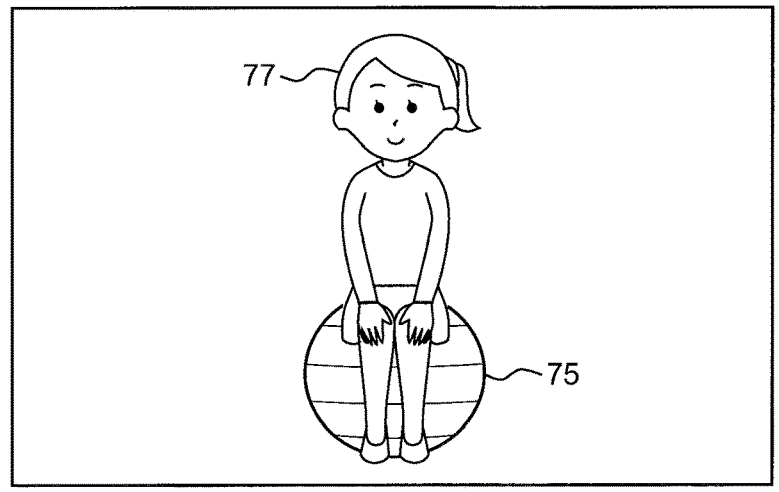

[FIG. 15]
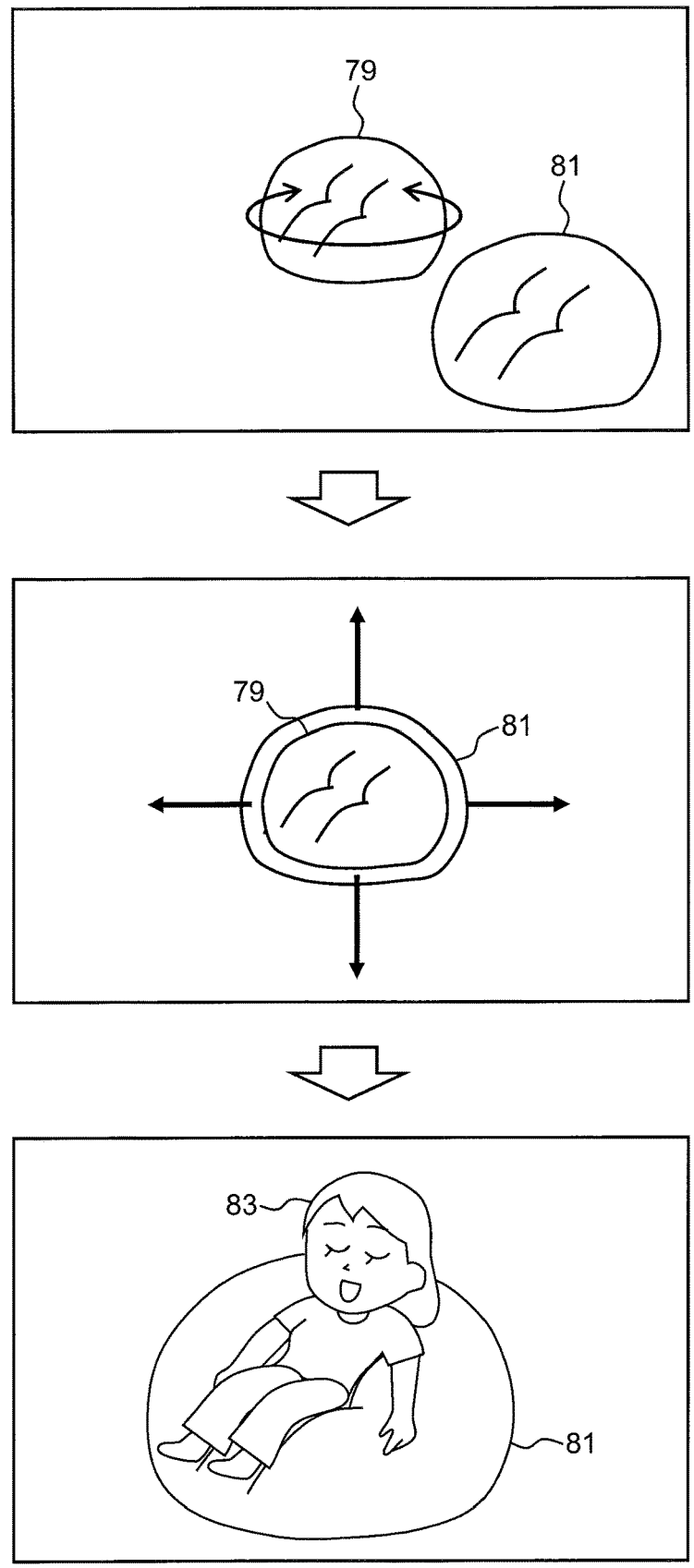

[FIG. 16]
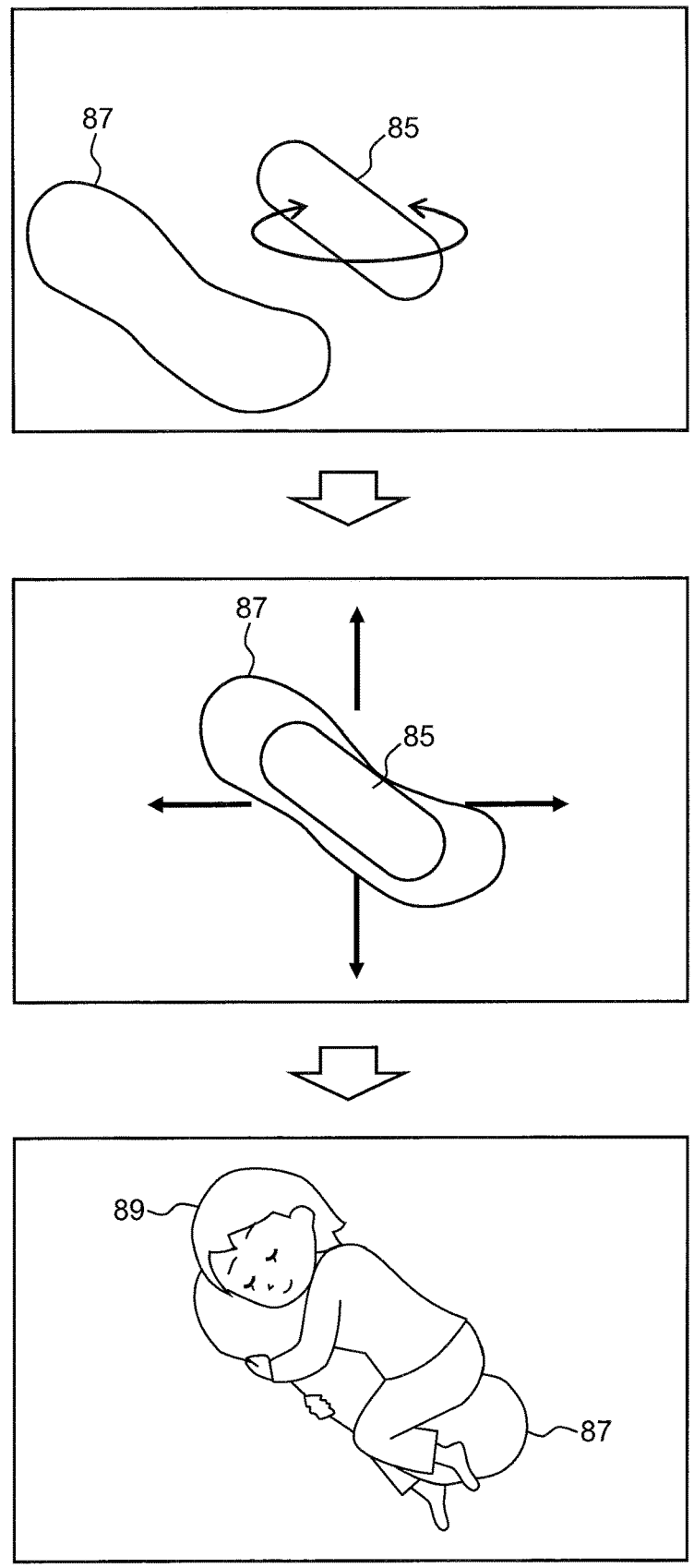

[FIG. 17]
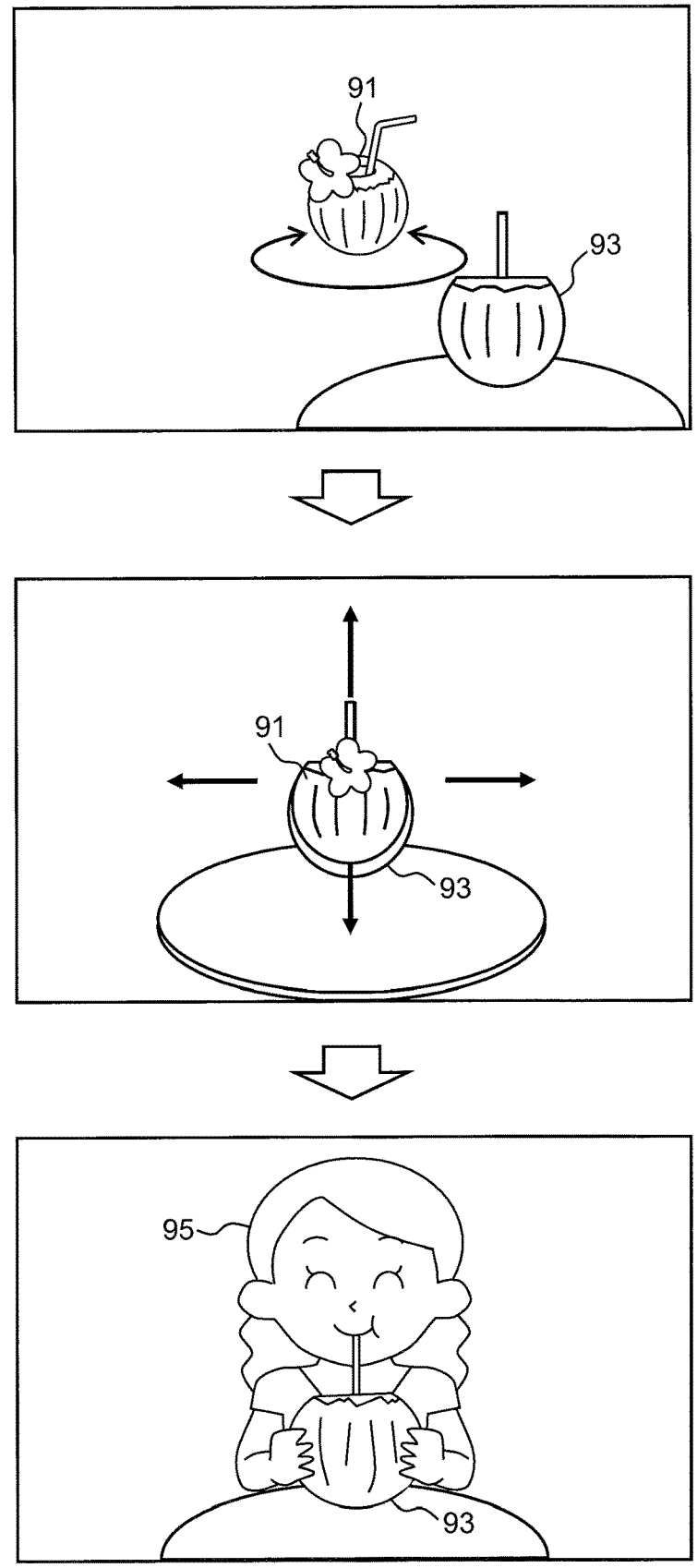

[FIG. 18]
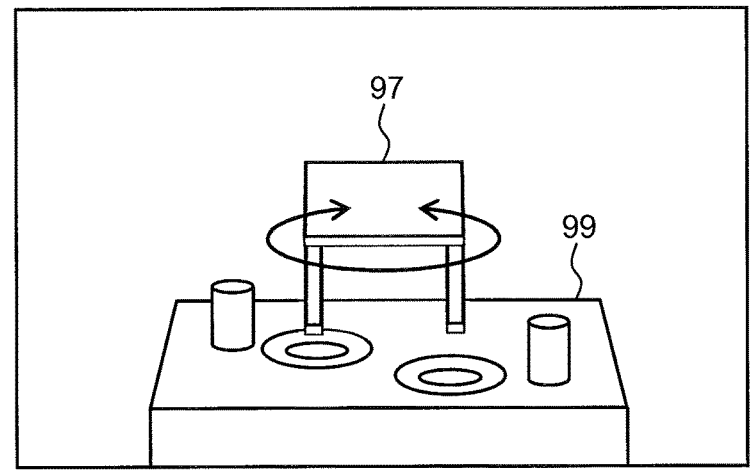
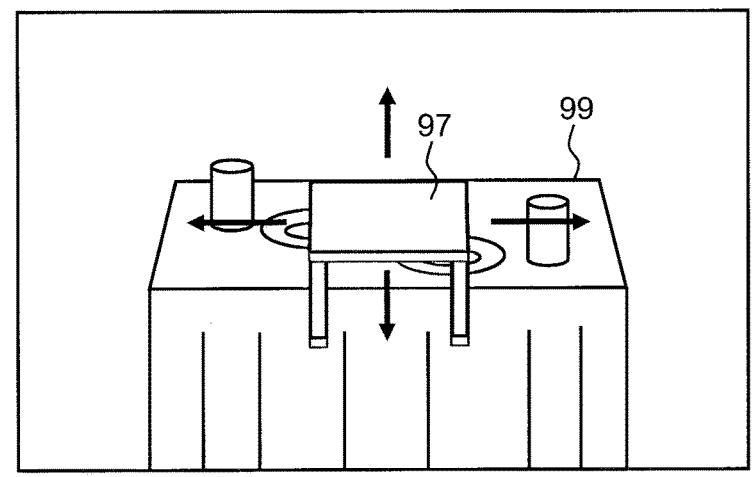
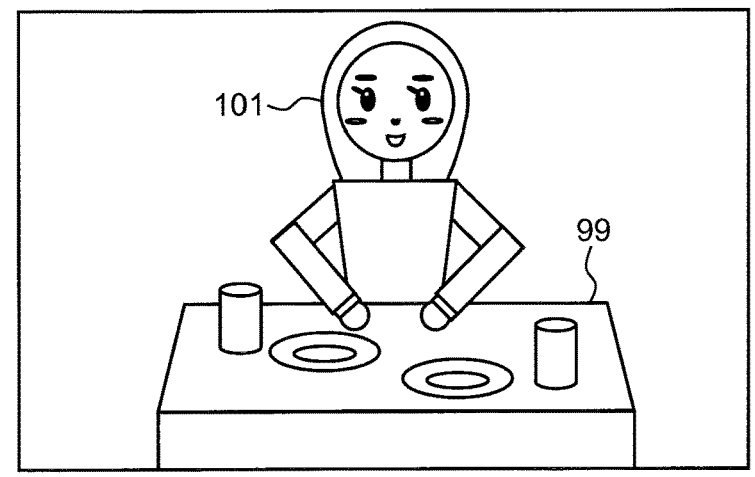

[FIG. 19]
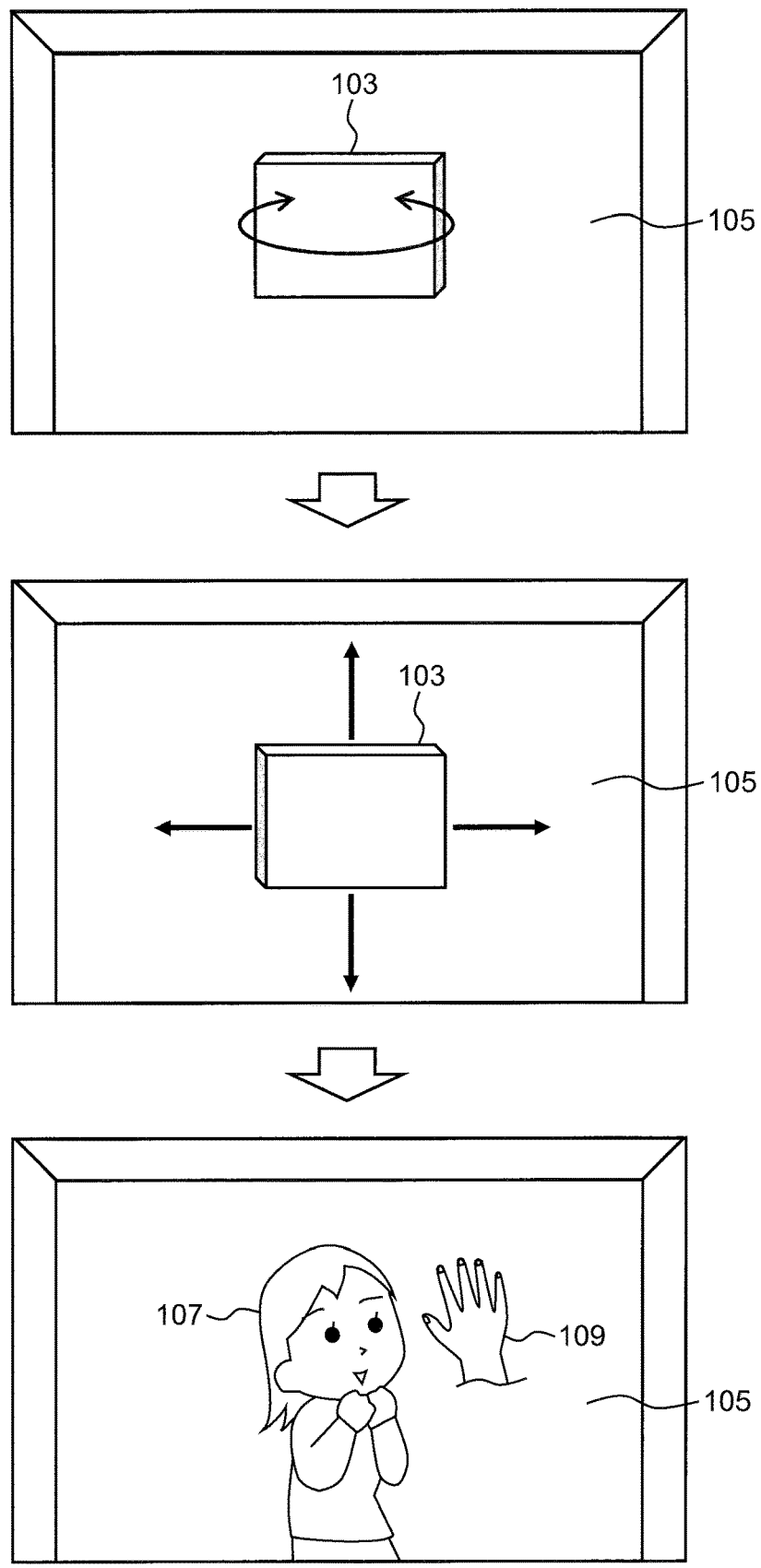

[FIG. 20]
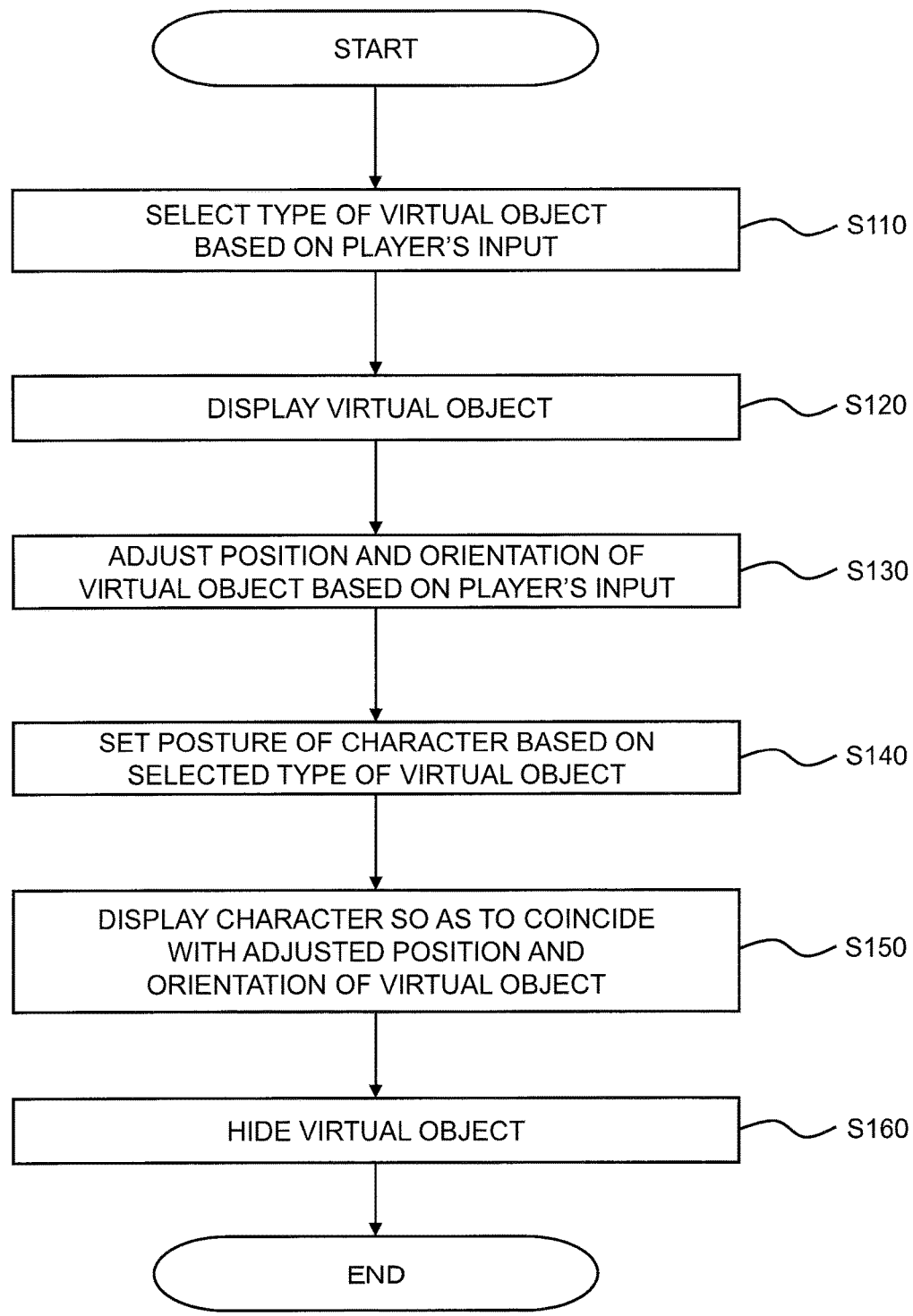

[FIG. 21]
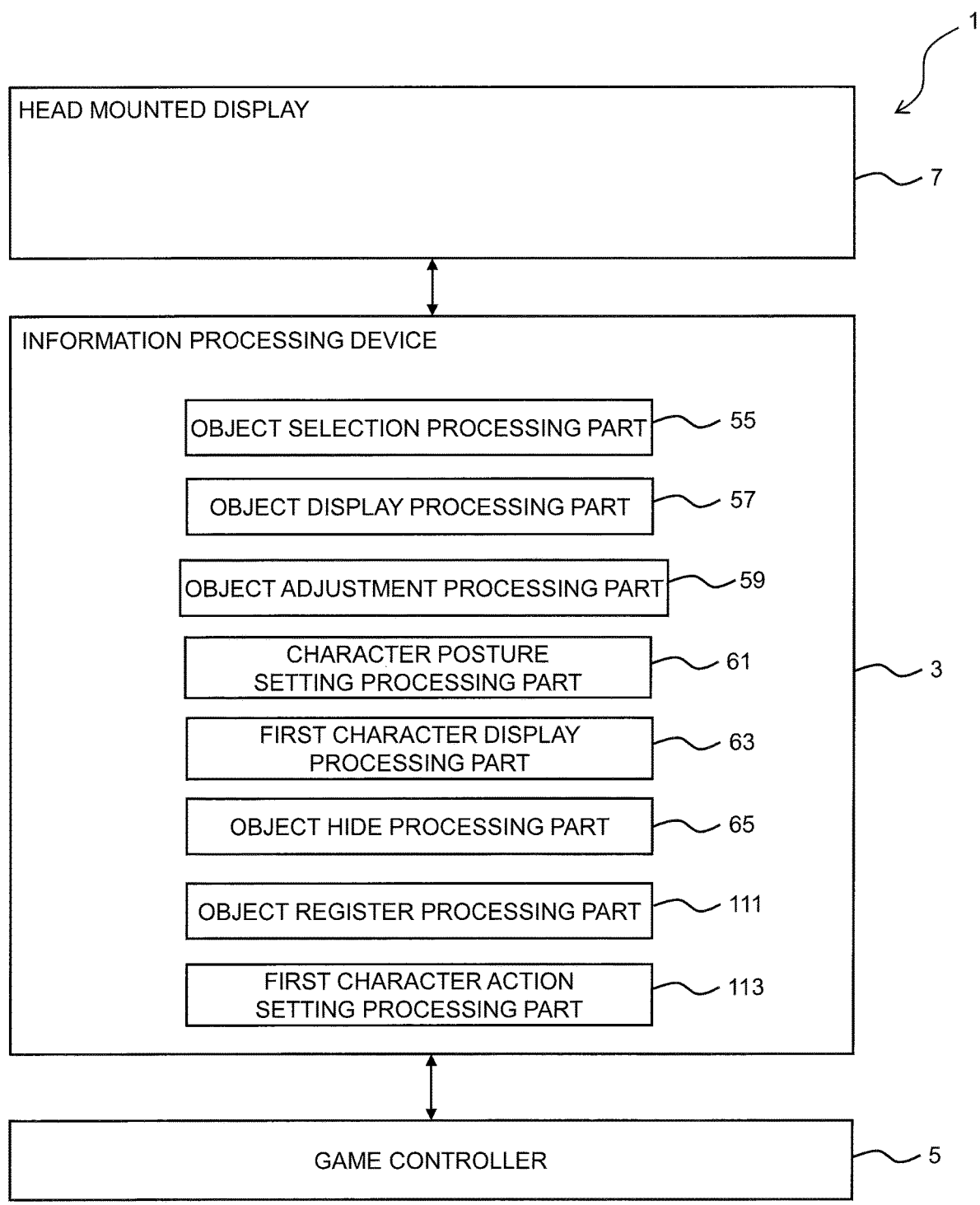

[FIG. 22]
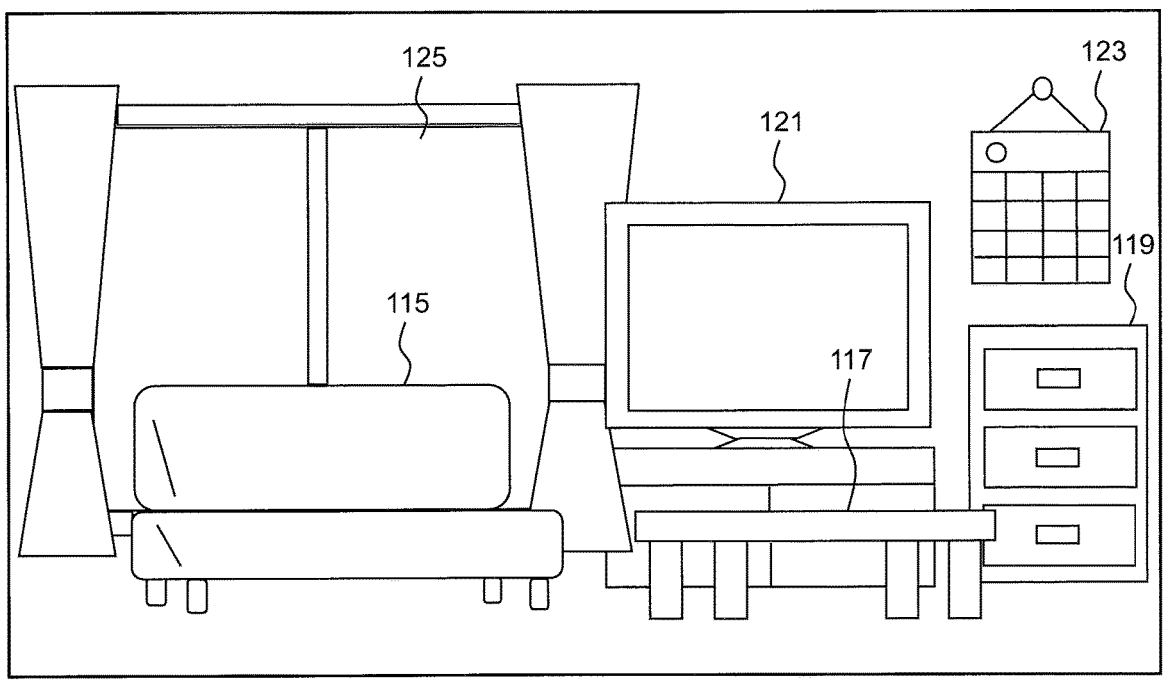

[FIG. 23]
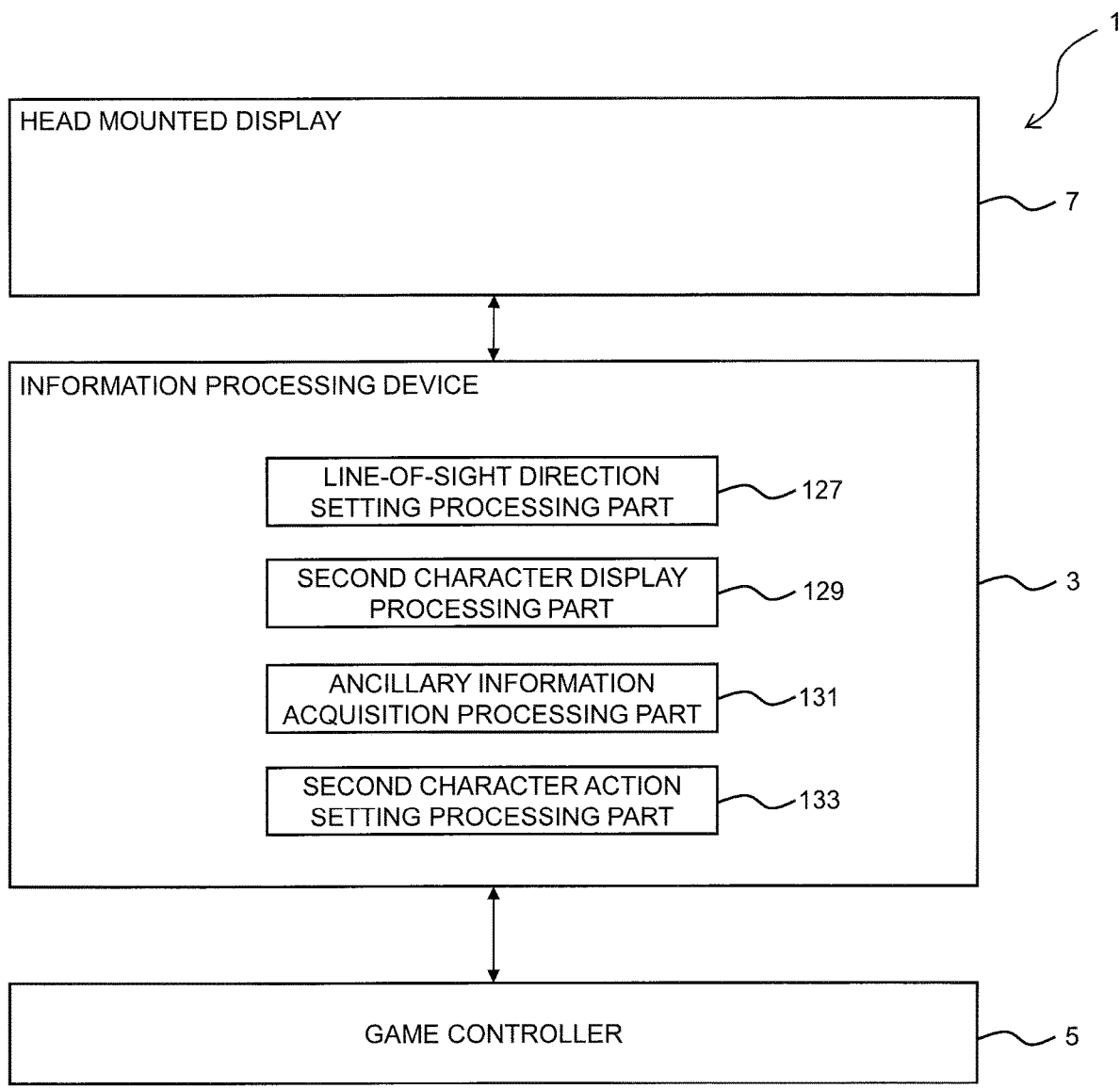

[FIG. 24]
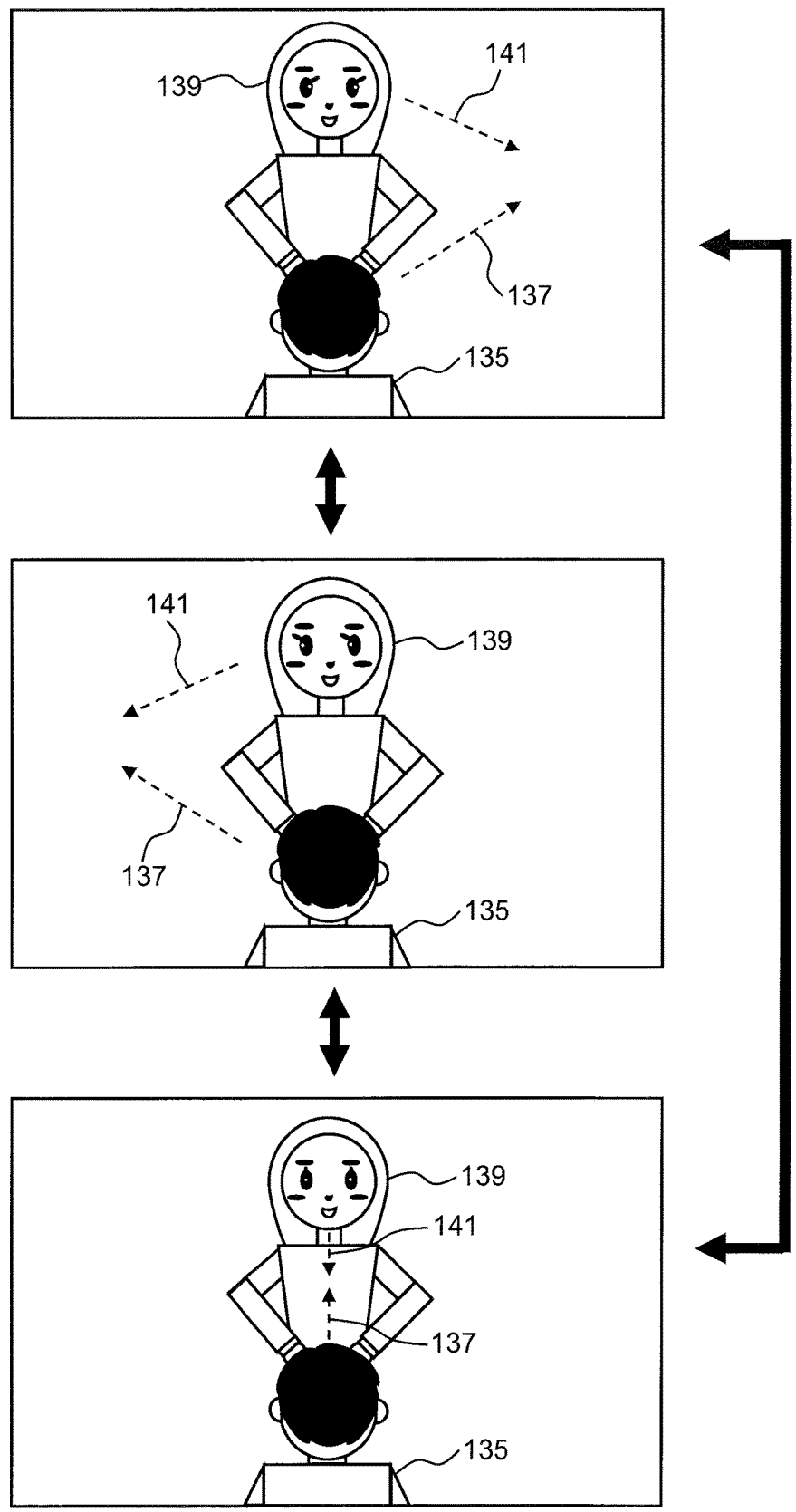

[FIG. 25]
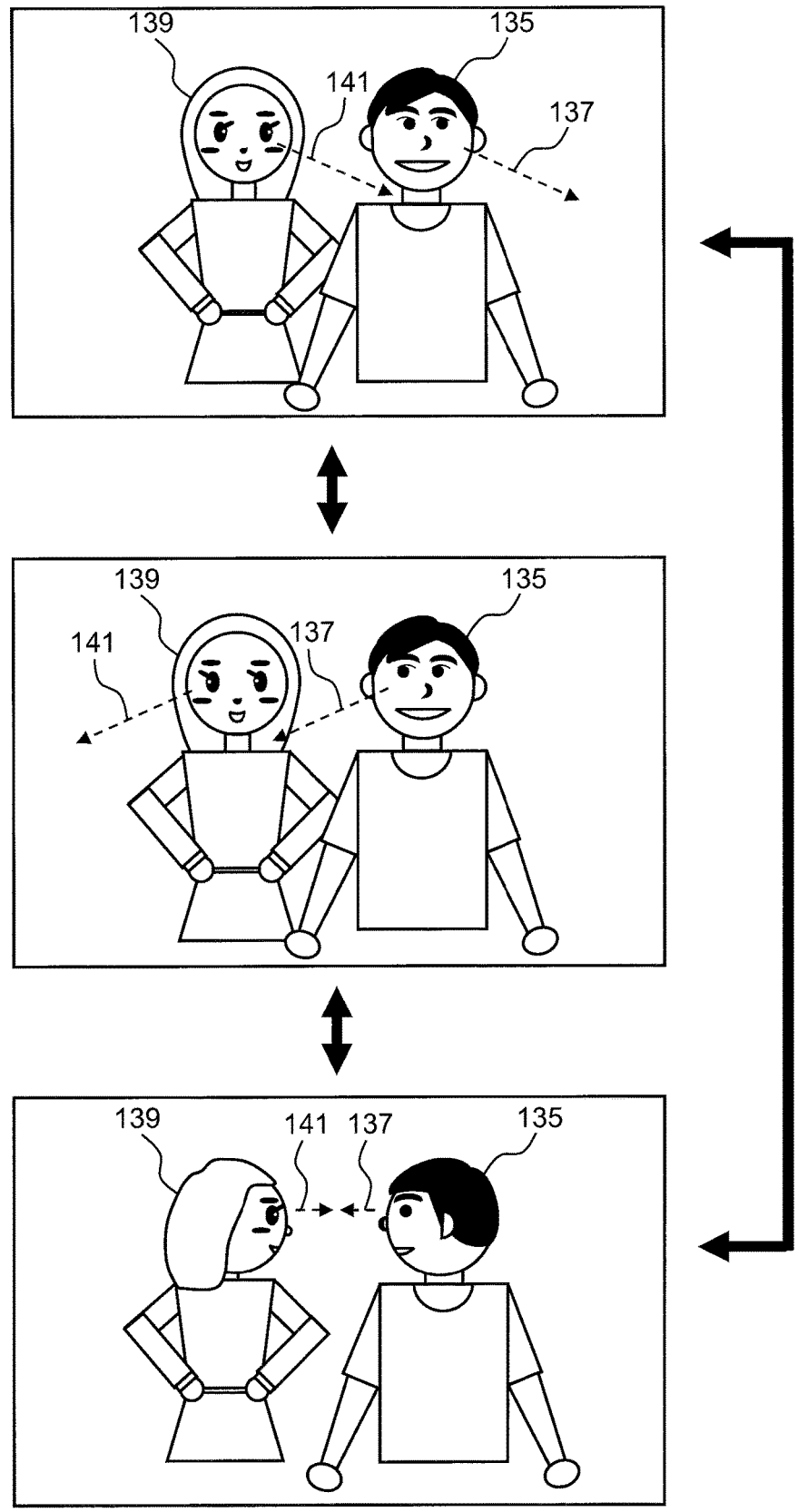

[FIG. 26]
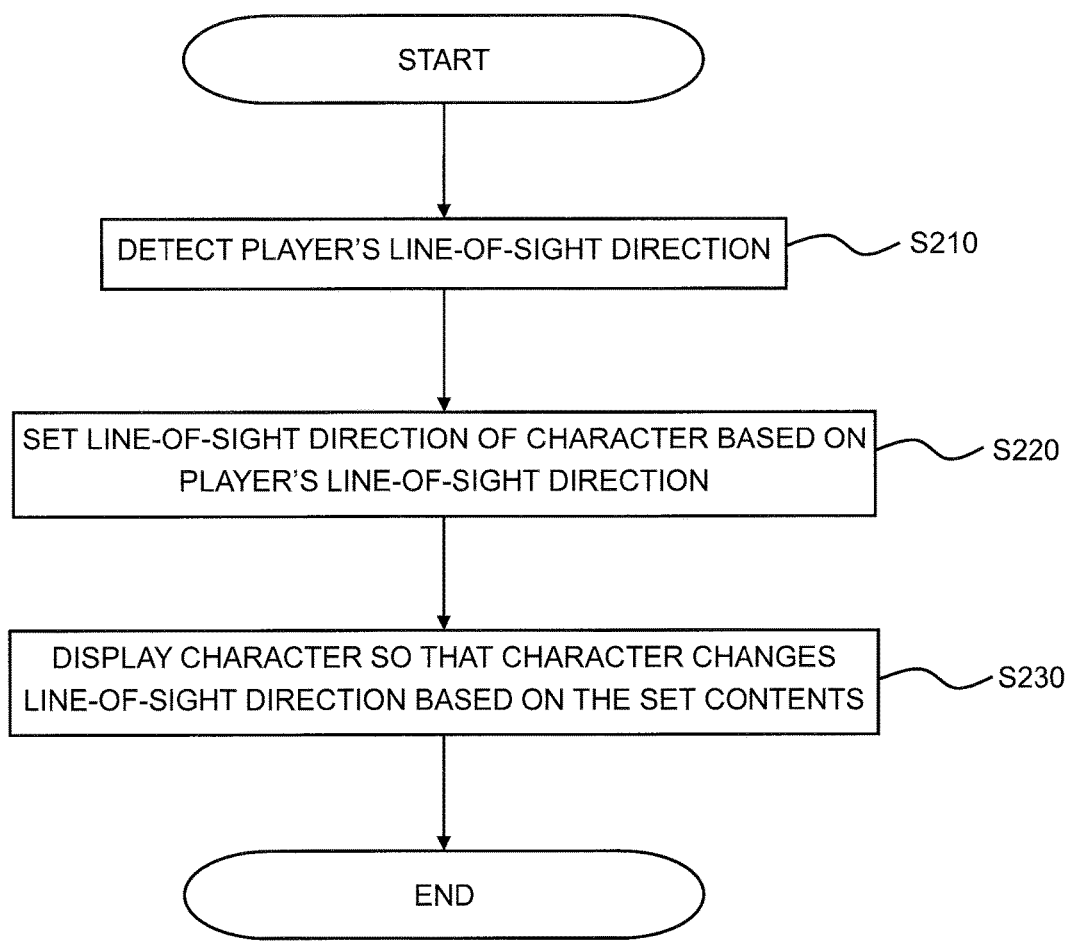

[FIG. 27]
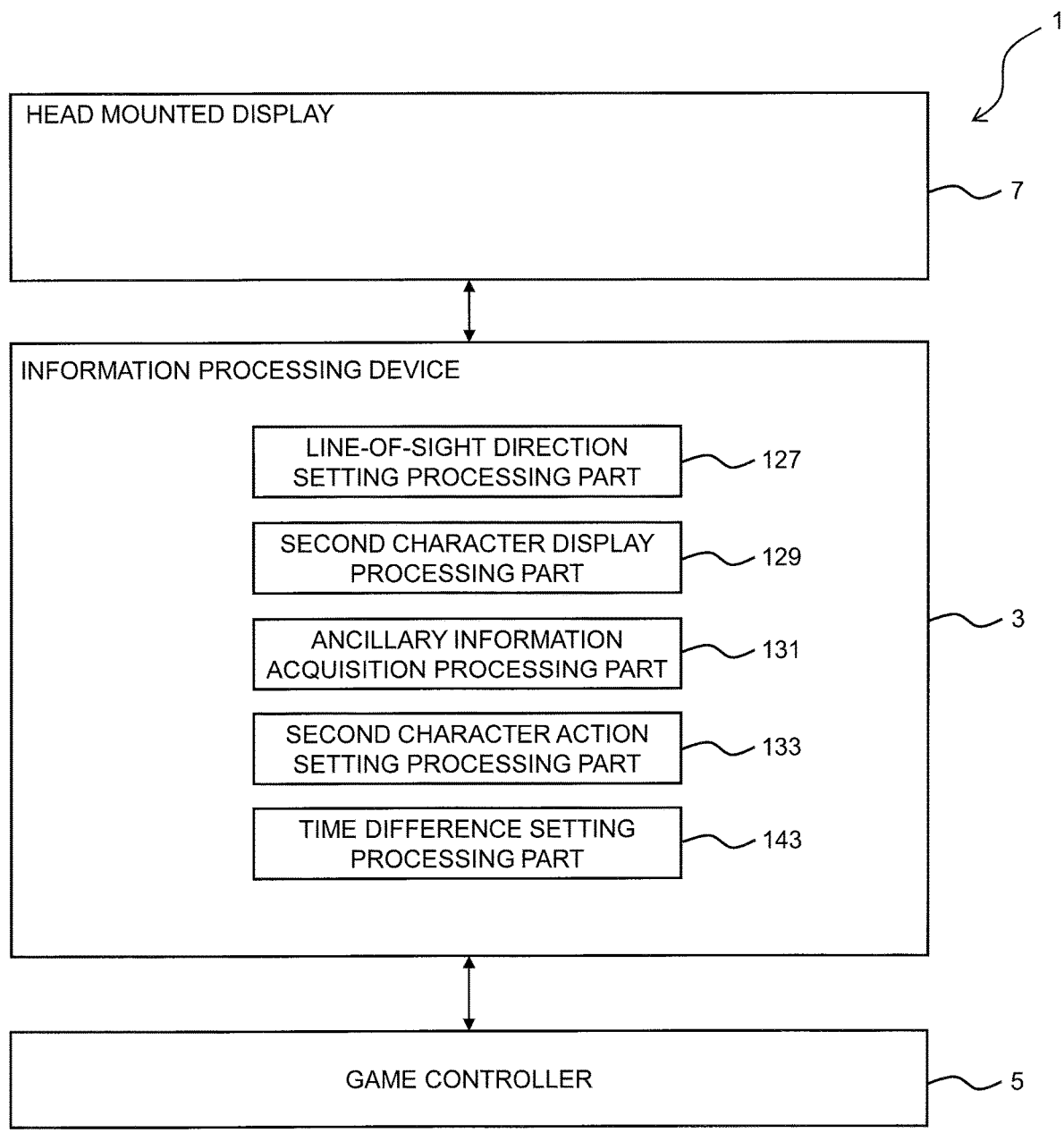

[FIG. 28]
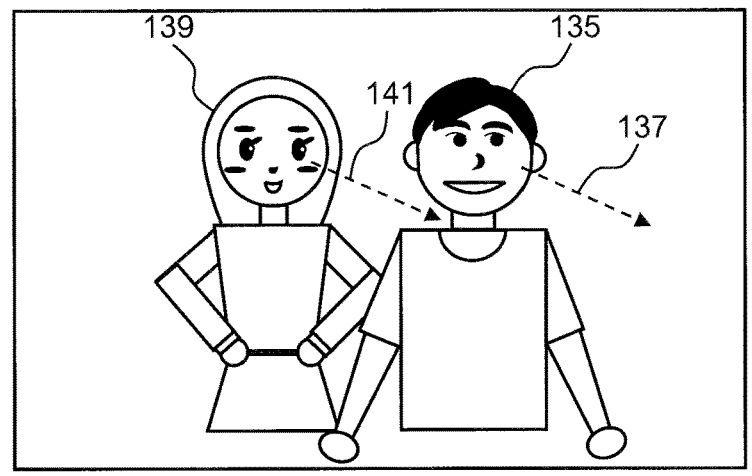
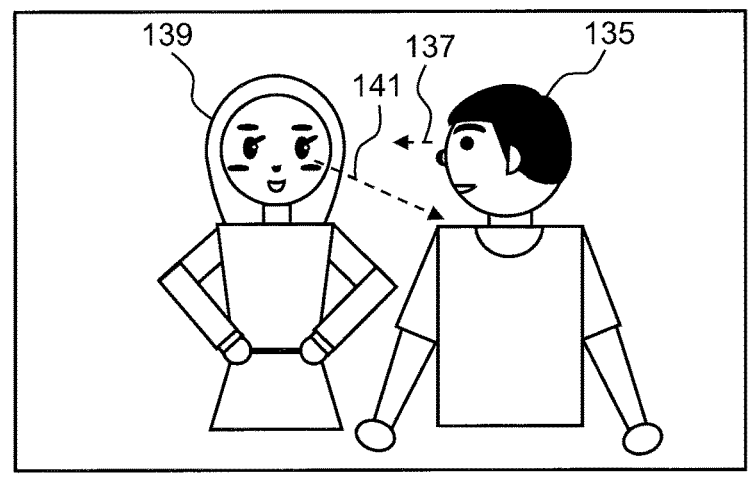
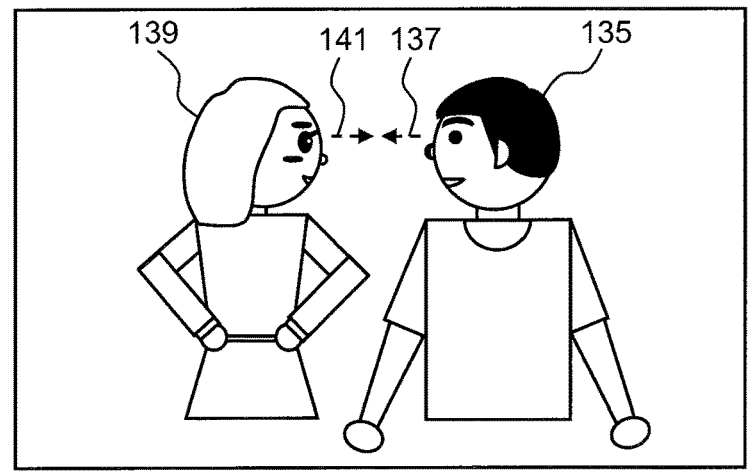

[FIG. 29]
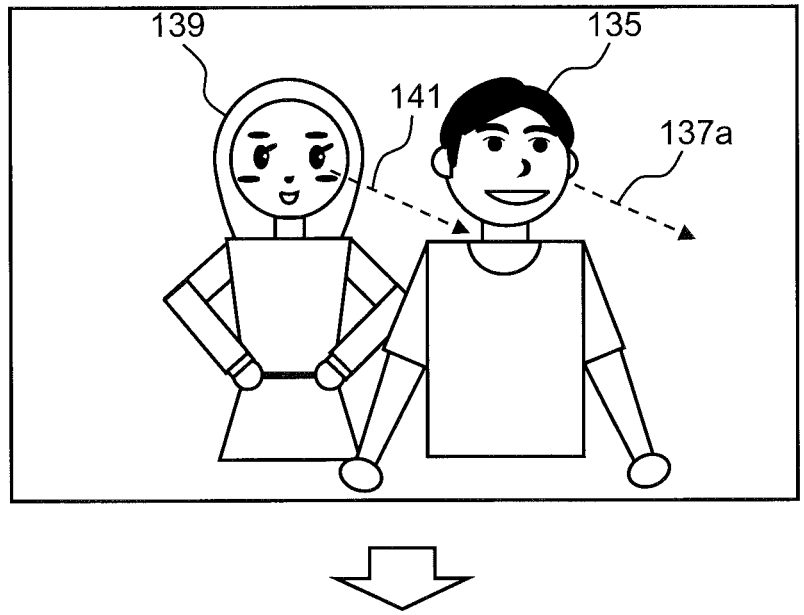
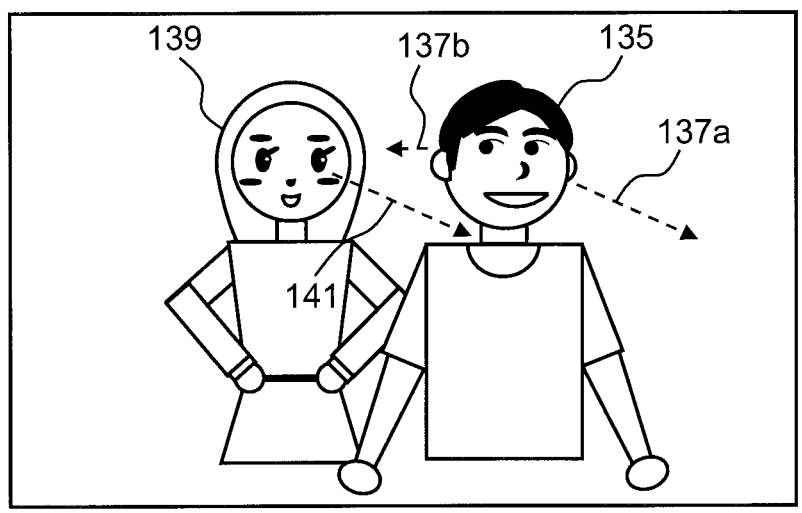

[FIG. 30]
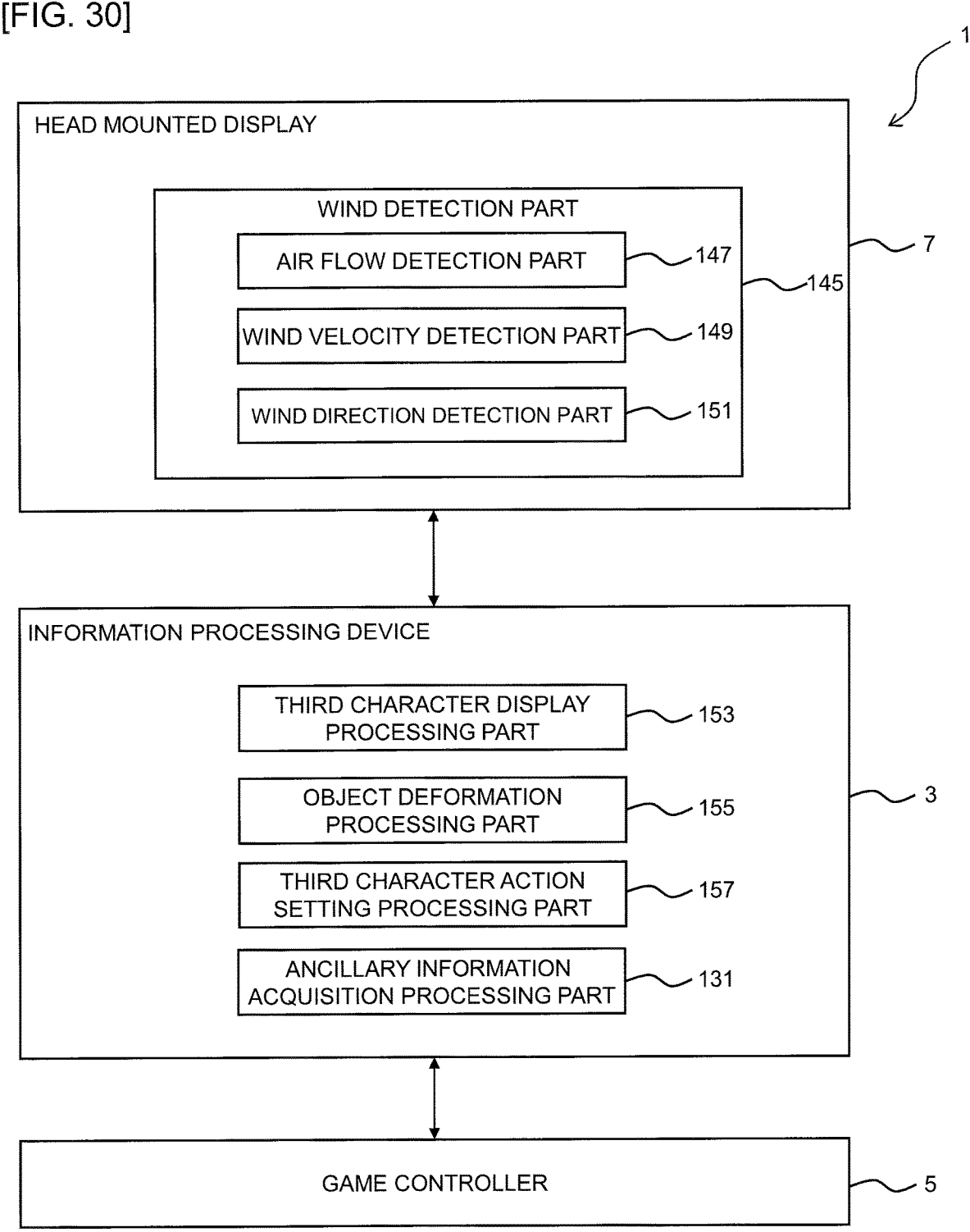

[FIG. 31]
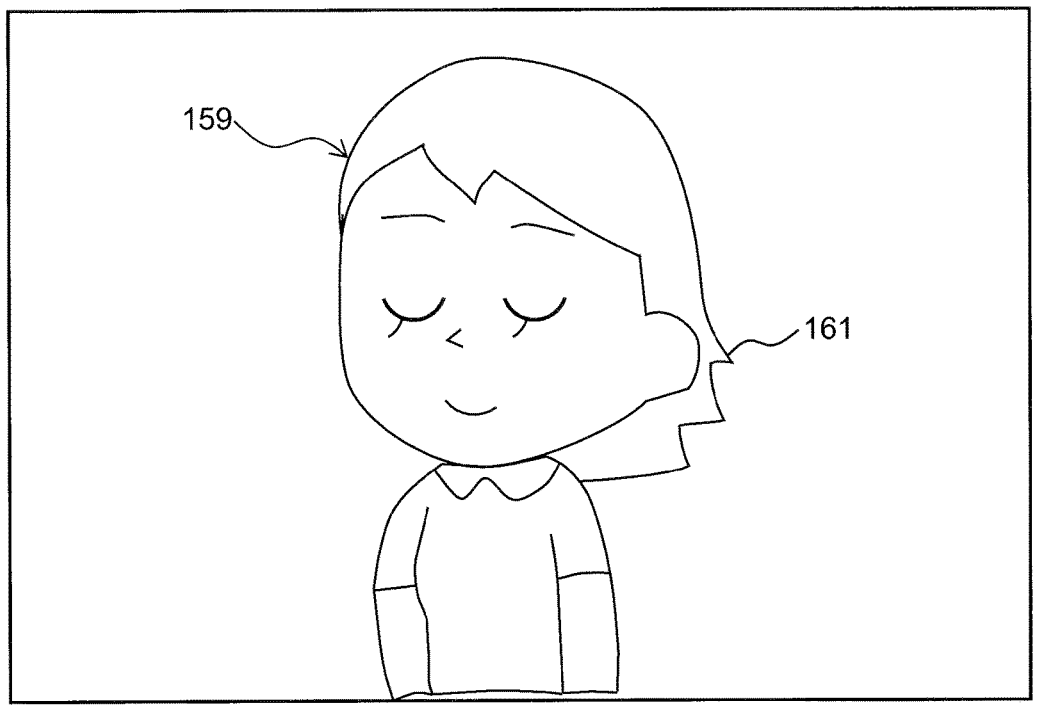
[FIG. 32]
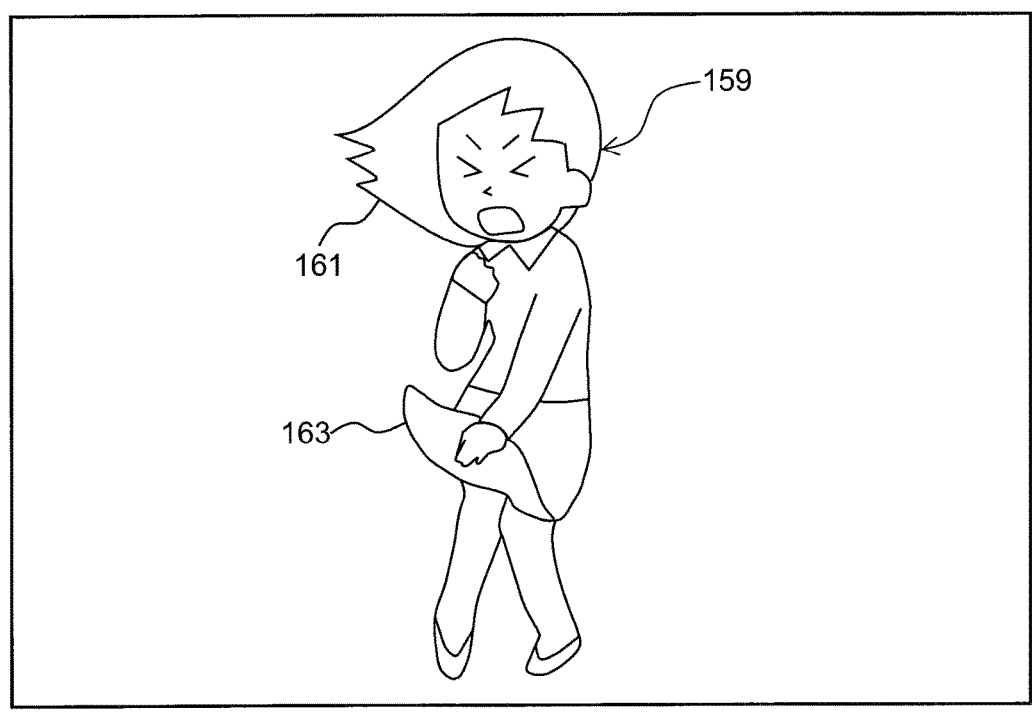

[FIG. 33]
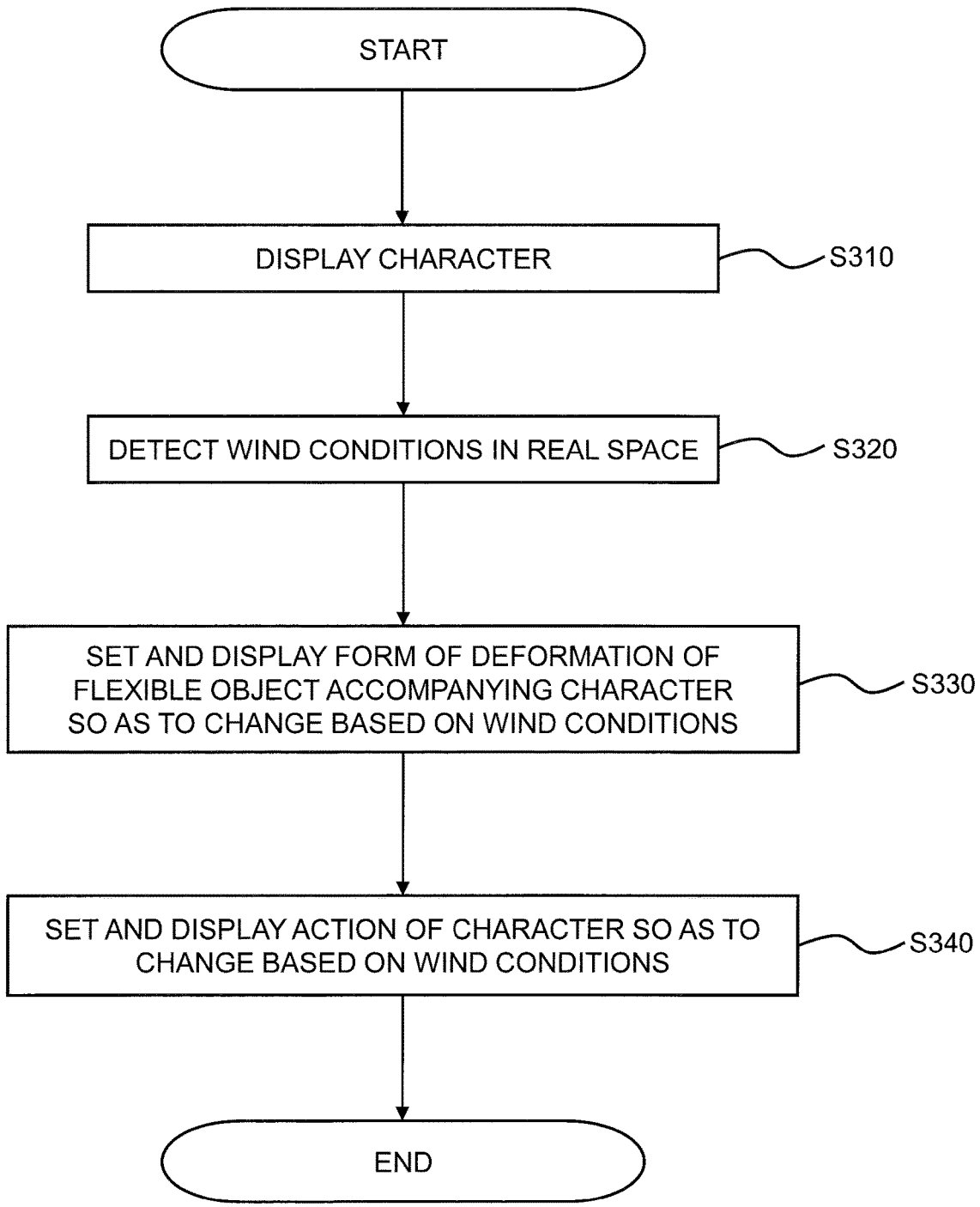

[FIG. 34]
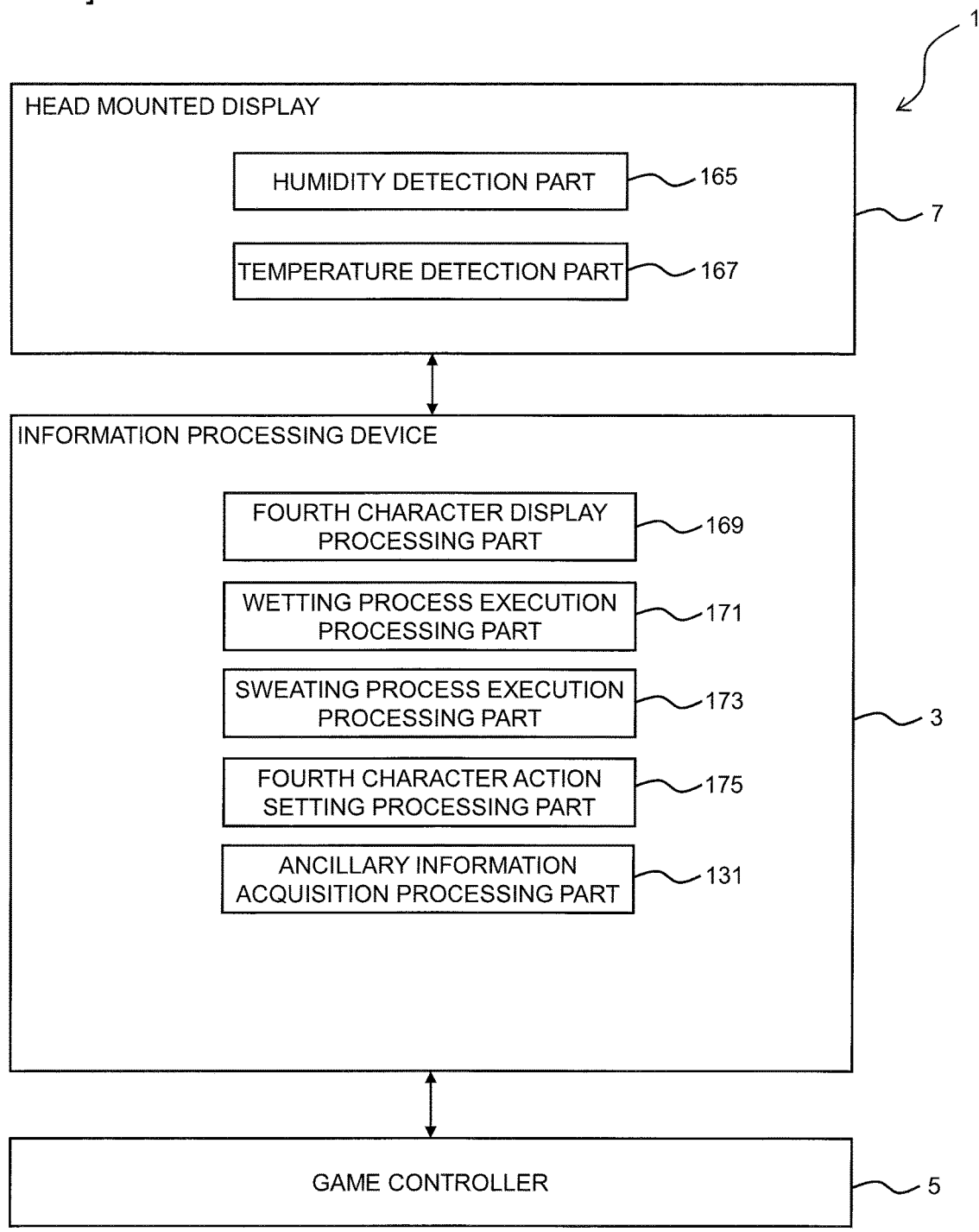

[FIG. 35]
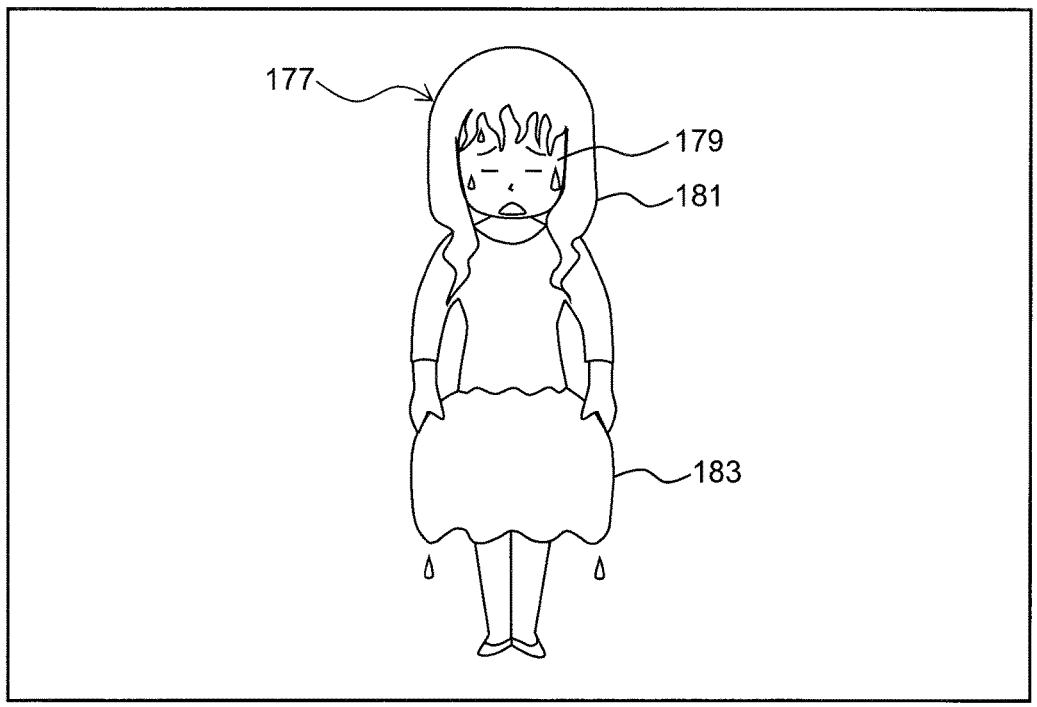
[FIG. 36]
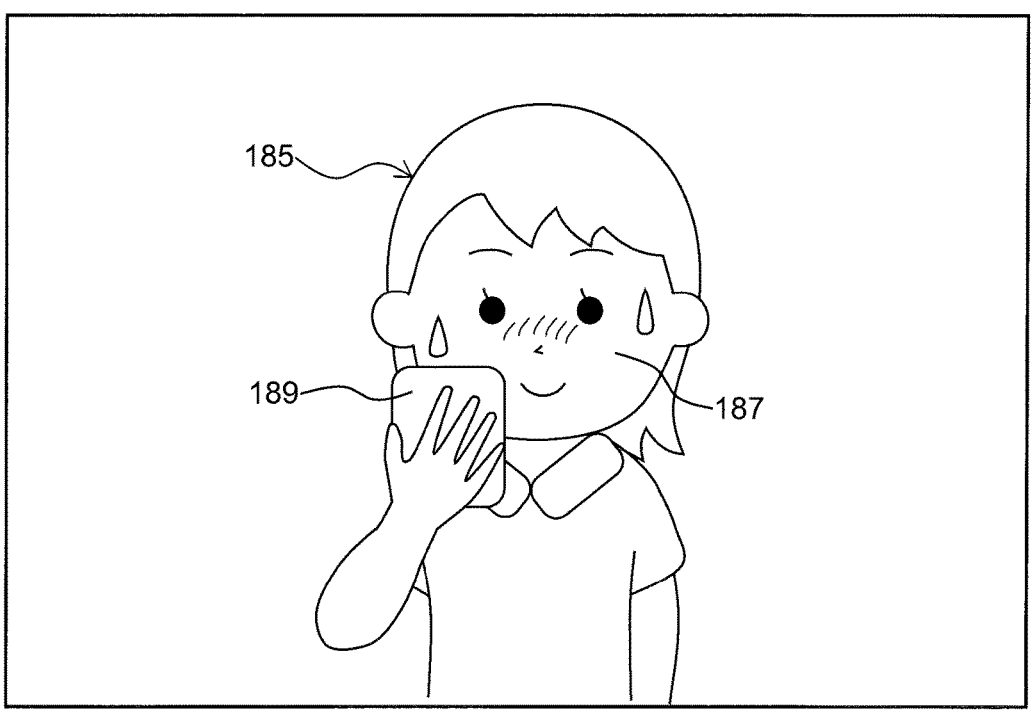

[FIG. 37]
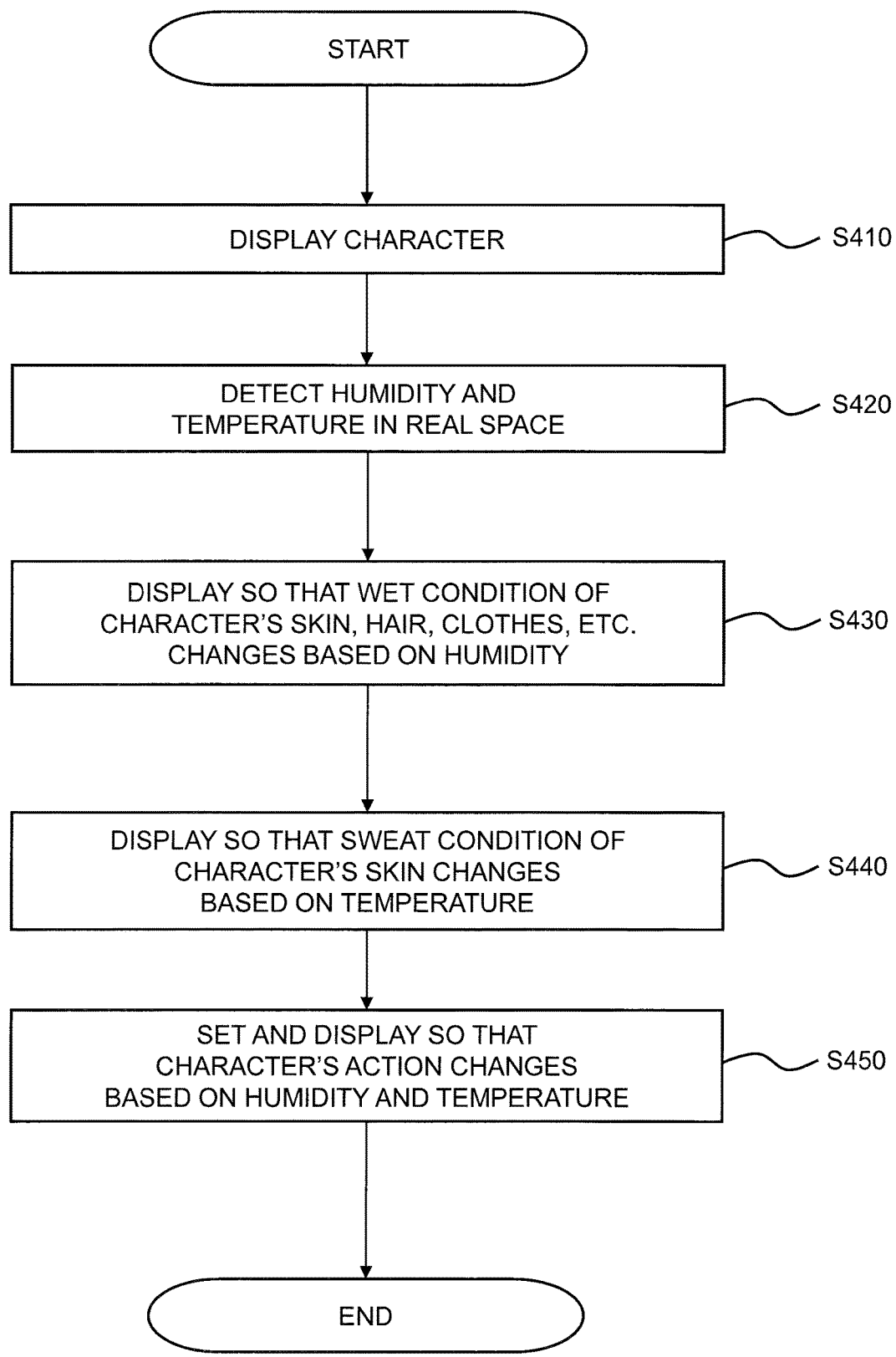

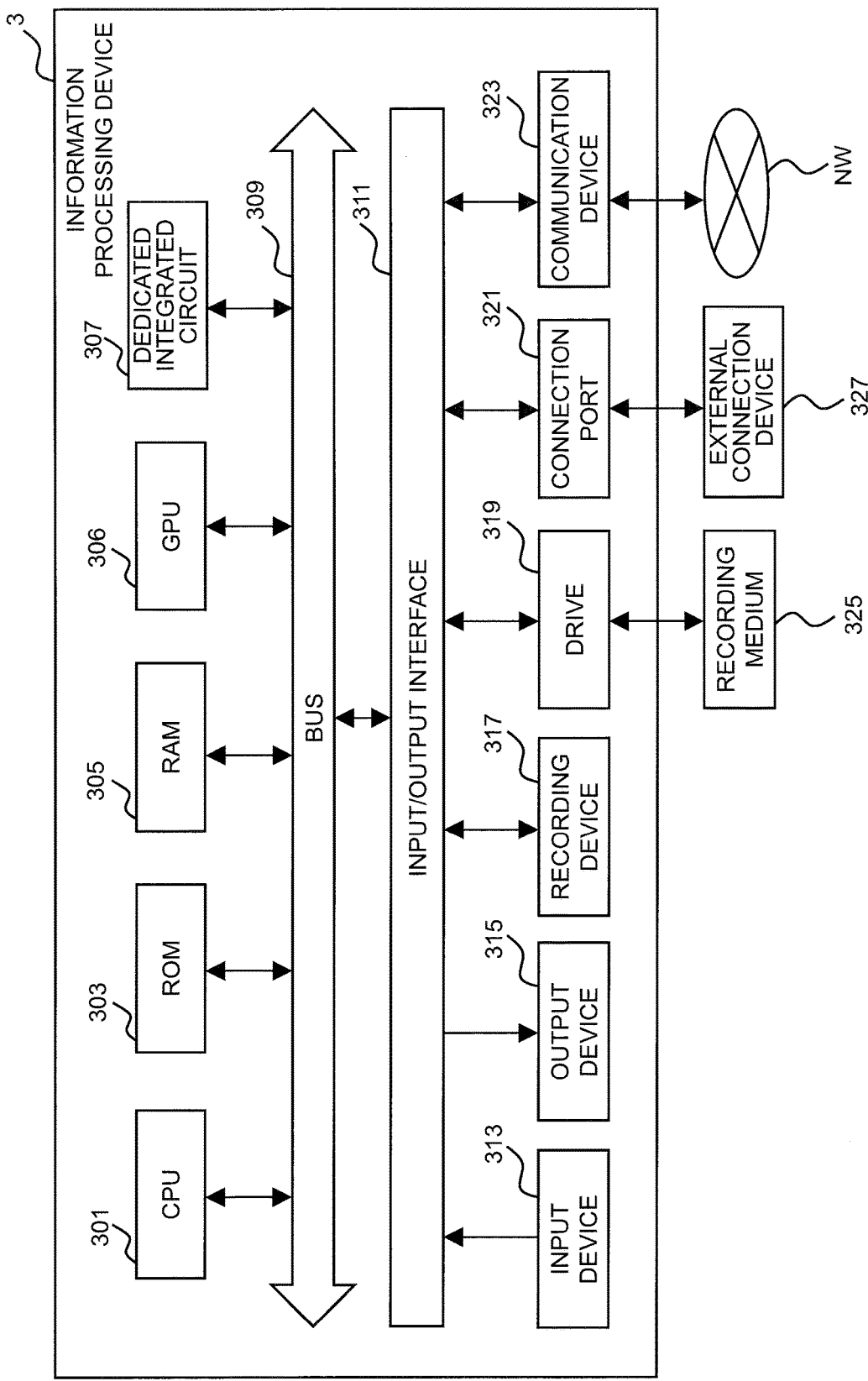
[FIG. 38]

GAME PROCESSING METHOD AND RECORD MEDIUM

CROSS-REFERENCE TO RELATED APPLICATION

The present application is based upon and claims the benefit of priority to Japanese Patent Application No. 2021-061671, filed Mar. 31, 2021. The entire contents of this application are incorporated herein by reference.

TECHNICAL FIELD

Background of the Invention

The present invention relates to a game processing method and a record medium.

Description of Background Art

A game system has hitherto been known that performs game processing that reflects a relationship between a player's line of sight and a character. For example, JP,A,2015-231443 describes a game system that performs game processing by: acquiring, based on line-of-sight information, line-of-sight relation information indicative of a relationship between a character that is a subject of a game play of the player and the player's line of sight and changing a game parameter based on the line-of-sight relation information.

In the prior art, the player and the character communicate with each other in a virtual three-dimensional space. It has been difficult, however, to share the experience in real world with the character.

SUMMARY OF THE INVENTION

The present invention was conceived in view of the problem. An object of the present invention is to provide a game processing method and a record medium, capable of sharing the experience in real world with a game character.

Means for Solving the Problem

According to one aspect of the present invention, a game processing method executed by an information processing device configured to perform transmission/reception of signals to/from a display part configured to be attachable to a head of a player to display a virtual image superimposed on an image in real space, the method includes causing the display part to display an image of a virtual object, adjusting at least one of a position or an orientation of the virtual object relative to the image in real space, based on an input of the player, causing the display part to display an image of a virtual game character so as to be arranged coinciding with the adjusted at least one of the position or the orientation of the virtual object, and hiding the image of the virtual object when the image of the game character is displayed.

According to another aspect of the present invention, a non-transitory recording medium readable by an information processing device configured to perform transmission/reception of signals to/from a display part configured to be attachable to a head of a player to display a virtual image superimposed on an image in real space, the recording medium storing a game program programmed to cause the information processing device to cause the display part to display an image of a virtual object, adjust at least one of a position or an orientation of the virtual object relative to the image in real space, based on an input of the player, cause the display part to display an image of a virtual game character so as to be arranged coinciding with the adjusted at least one of the position or the orientation of the virtual object, and hide the image of the virtual object when the image of the game character is displayed.

Advantages of the Invention

According to the game processing method and the record medium of the present invention, the experience in real world can be shared with the game character.

BRIEF DESCRIPTION OF THE DRAWINGS

FIG. 1 is a system configuration diagram showing an example of an overall configuration of a game system that is common to each embodiment.

FIG. 2 is a block diagram showing an example of a schematic configuration of a head mounted display.

FIG. 3 is a diagram showing specific examples of a manual operation made by the player.

FIG. 4 is a flowchart showing an example of a flow of a game that is executed by the control part of the head mounted display and an information processing device.

FIG. 5 is a diagram showing an example of a character selection screen.

FIG. 6 is a diagram showing an example of a position adjustment screen of a virtual object.

FIG. 7 is a diagram showing an example of an orientation adjustment screen of the virtual object.

FIG. 8 is a diagram showing an example of a screen displaying a game character.

FIG. 9 is a diagram showing an example of a game screen in the case of touching the game character.

FIG. 10 is a diagram showing an example of the game screen in a hand fan mode.

FIG. 11 is a diagram showing an example of the game screen in a spray mode.

FIG. 12 is a diagram showing an example of a functional configuration of the information processing device according to a first embodiment.

FIG. 13 is a diagram showing an example of a screen on which the position and orientation of a virtual object of a chair with backrest are adjusted to display the game character.

FIG. 14 is a diagram showing an example of a screen on which the position and orientation of a virtual object of a balance ball are adjusted to display the game character.

FIG. 15 is a diagram showing an example of a screen on which the position and orientation of a virtual object of a seated cushion are adjusted to display the game character.

FIG. 16 is a diagram showing an example of a screen on which the position and orientation of a virtual object of a hugging pillow are adjusted to display the game character.

FIG. 17 is a diagram showing an example of a screen on which the position and orientation of a virtual object of a glass with a straw are adjusted to display the game character.

FIG. 18 is a diagram showing an example of a screen on which the position and orientation of a virtual object of a table are adjusted to display the game character.

FIG. 19 is a diagram showing an example of a screen on which the position and orientation of a virtual object of a wall are adjusted to display the game character.

FIG. 20 is a flowchart showing an example of a process procedure executed by a CPU of the information processing device according to the first embodiment.

FIG. 21 is a block diagram showing an example of a functional configuration of the information processing device according to a modification example of the first embodiment.

FIG. 22 is a diagram showing an example of real space encompassing virtual objects to be registered.

FIG. 23 is a block diagram showing an example of a functional configuration of the information processing device according to a second embodiment.

FIG. 24 is an explanatory view showing an example of the case that the line-of-sight direction of the game character is changed following the line-of-sight direction of the player when the player and the game character confront each other.

FIG. 25 is an explanatory view showing an example of the case that the line-of-sight direction of the game character is changed following the line-of-sight direction of the player when the player and the game character are side by side.

FIG. 26 is a flowchart showing an example of a process procedure executed when setting and changing the line-of-sight direction of the game character based on the player's line-of-sight direction by the CPU of the information processing device according to the second embodiment.

FIG. 27 is a block diagram showing an example of a functional configuration of the information processing device according to a modification example of the second embodiment.

FIG. 28 is an explanatory view showing examples of changes of the line-of-sight direction of the game character and the player's line-of-sight direction occurring when a time difference is set in the case that the player and the game character are side by side.

FIG. 29 is an explanatory view showing examples of the head's orientation and eyes' orientation of the game character and change of the player's line-of-sight direction occurring when the line-of-sight direction of the game character is set based on the head's orientation of the player in the case that the player and the game character are side by side.

FIG. 30 is a block diagram showing examples of a configuration of the head mounted display and a functional configuration of the information processing device, according to a third embodiment.

FIG. 31 is a diagram showing an example of the game screen in the third embodiment.

FIG. 32 is a diagram showing another example of the game screen in the third embodiment.

FIG. 33 is a flowchart showing an example of a process procedure executed when the form of deformation or the action of a flexible object accompanying the game character is changed in accordance with detected wind conditions, by the CPU of the information processing device according to the third embodiment.

FIG. 34 is a block diagram showing examples of a configuration of the head mounted display and a functional configuration of the information processing device, according to a fourth embodiment.

FIG. 35 is a diagram showing an example of the game screen in the fourth embodiment.

FIG. 36 is a diagram showing another example of the game screen in the fourth embodiment.

FIG. 37 is a flowchart showing an example of a process procedure executed when the wet condition or the sweat condition of skin of a game character or an object accompanying the game character is changed in accordance with detected humidity or temperature, by the CPU of the information processing device according to the fourth embodiment.

FIG. 38 is a block diagram showing an example of a hardware configuration of the information processing device.

DETAILED DESCRIPTION OF THE EMBODIMENTS

First to fourth embodiments of the present invention will now be described with reference to the drawings.

<1. Overall Configuration of Game System>

Referring first to FIG. 1, description will be given of an example of the overall configuration of a game system 1 common to the embodiments. As shown in FIG. 1, the game system 1 includes an information processing device 3, a game controller 5, and a head mounted display 7. The game controller 5 and the head mounted display 7 are each connected to the information processing device 3 so as to be capable of communicating (sending/receiving signals) by wire or wirelessly.

The information processing device 3 is e.g. a non-portable game console. However, the information processing device 3 is not limited thereto and may be e.g. a portable game console integrally having an input part, a display part, etc. In addition to the game consoles, for example, the information processing device 3 may be ones e.g. manufactured and sold as computers such as e.g. a server computer, a desktop computer, a laptop computer, and a tablet computer, or may be ones e.g. manufactured and sold as telephones such as e.g. a smartphone, a cellular phone, and a phablet.

By mounting the information processing device 3 onto the head mounted display 7, the information processing device 3 and the head mounted display 7 may be integrally configured. In the case that the head mounted display 7 has the same function as the information processing device 3 does, the information processing device 3 may be excluded.

The player performs various operation inputs using the game controller 5. In the example shown in FIG. 1, the game controller 5 includes e.g. a cross key 9, a plurality of buttons 10, a joystick 11, a touch pad 12, etc.

The head mounted display 7 is a display device wearable on the user's head or face to implement so-called mixed reality (MR). The head mounted display 7 includes a transmissive display part 13 and displays thereon a virtual image in relation to a game generated by the information processing device 3, superimposed on an image in real space.

<2. Schematic Configuration of Head Mounted Display>

Referring next to FIGS. 2 and 3, an example of the schematic configuration of the head mounted display 7 will be described. As shown in FIG. 2, the head mounted display 7 includes the display part 13, a line-of-sight direction detection part 15, a position detection part 17, an audio input part 19, an audio output part 21, a manual operation input part 23, an information acquisition part 25, and a control part 27.

The display part 13 is configured from, e.g. a transmissive (see-through) liquid crystal display or organic EL display. The display part 13 displays thereon, as e.g. a holographic video, a virtual image in relation to a game generated by the information processing device 3, superimposed on an image in real space that can be seen through. The virtual image may be either a 2D image or a 3D image. The virtual image may be either a still image or a moving image. The display part 13 may be of non-transmissive type so that a virtual image generated by the information processing device 3 is superimposed and displayed on an image in real space captured by a camera for example.

The line-of-sight direction detection part 15 detects the line-of-sight direction of the player. As used herein, the "line-of-sight direction of the player" refers to a combined direction of both the eye orientation and the head orientation of the player. For example, in the case that the player turns the orientation of his head to the right from a reference direction and then turns the orientation of his eyes further to the right, the line-of-sight direction is an added direction of a head angle to the right and an eye angle to the right with respect to the reference direction. The line-of-sight direction detection part 15 includes an eye direction detection part 29 and a head direction detection part 31.

The eye direction detection part 29 detects an eye orientation of the player. The eye orientation is detected as e.g. a relative direction (angle) with respect to the frontal direction of the head. The eye orientation detection technique is not particularly limited, and various detection techniques can be employed. For example, the eye direction detection part 29 may be composed of an infrared LED, an infrared camera, etc. In this case, the infrared camera captures an image of eyes irradiated with light from the infrared LED. From the captured image, the control part 27 may figure out the player's eye orientation based on, e.g. with a reference point being the position on the cornea of reflected light (corneal reflex) brought about by irradiation of the infrared LED light and a moving point being the pupil, the position of the pupil relative to the position of the corneal reflex. For example, the eye direction detection part 29 may be composed of a visible light camera, etc. From a player's eye image captured by the visible light camera, the control part 27 may calculate the eye orientation based on, e.g. with the reference point being the eye's inner corner and the moving point being the iris (so-called black eye), the position of the iris relative to the eye's inner corner.

The head direction detection part 31 detects a head orientation (face orientation) of the player. The head orientation is detected as e.g. a direction (vector) in a static coordinate system in real space, recognized by a space recognition process described later. The head direction detection technique is not particularly limited, and various detection techniques can be adopted. For example, the head mounted display 7 may include an accelerometer or a gyro sensor so that based on the detection result of the sensor, the control part 27 calculates a head direction of the player.

The position detection part 17 detects a head position of the player. The head position detection technique is not particularly limited, and various detection techniques can be employed. For example, the technique may be one where a plurality of cameras and a plurality of depth sensors are disposed around the head mounted display 7 so that the depth sensors recognize the player's surrounding space (real space) and so that based on the results of detection done by the plurality of cameras, the control part 27 recognizes the player's head position in the surrounding space. For example, a camera may be disposed on the exterior of the head mounted display 7 with marks such as light emitting parts being placed on the head mounted display 7 so that the external camera detects the player's head position.

The audio input part 19 is configured from e.g. a microphone to input the player's voice or other external sounds. The input player's voice is recognized as words through e.g. an audio recognition process effected by the control part 27, which in turn executes a process based on the recognized voice. The type of the input external sound is recognized through e.g. the audio recognition process effected by the control part 27, which in turn executes a process based on the recognized sound type.

The audio output part 21 is configured from e.g. a speaker to output audios to the player's ear. For example, characters' voices, sound effects, BGMs, etc. are output.

The manual operation input part 23 is configured from e.g. a camera to thereby detect a movement of the player's hand to input it as manual operation. The control part 27 executes a process based on the input manual operation. This enables the player to perform various operations by his hand's movement. Specifically, as shown in FIG. 3, operations are possible e.g. such as: "tap" operation of making once contact between the tips of the thumb and the index finger of the right hand; "double-tap" operation of making twice contact therebetween; and "rotate" operation of upward extending and rotating the index finger of the right hand. In addition to these, a wide variety of manual operations may be feasible.

The information acquisition part 25 connects to the Internet, etc. by e.g. wireless communication, to acquire various types of information from an information distribution site that distributes information, a database, etc. The information acquisition part 25 can acquire e.g. information related to date and time, weather, news, entertainment (concert and movie schedules, etc.), shopping (bargain sale, etc.), or the like. The information acquisition part 25 may acquire e.g. current position information of the player based on signals from GPS satellites.

The control part 27 executes various processes based on detection signals of various types of sensors. The various processes include e.g. an image display process, a line-of-sight direction detection process, a line-of-sight adjustment process, a position detection process, the space recognition process, the audio recognition process, an audio output process, a manual operation input process, and information acquisition process. In addition to these, a wide variety of processes may be executable.

The information processing device 3 generates or changes a virtual image to be displayed on the display part 13, to represent mixed reality (MR), based on the results of processes effected by the line-of-sight direction detection part 15, the position detection part 17, the audio input part 19, the manual operation input part 23, the information acquisition part 25, etc. of the head mounted display 7.

<3. Game Outline>

Referring next to FIGS. 4 to 11, an exemplary outline will be described of a game according to this embodiment, i.e. a game that is provided by executing a game program and a game processing method of the present invention by the information processing device 3.

The game according to this embodiment enables the player to communicate with a virtual game character who seems to exist in real space to the player, by superimposing an image of the game character on an image in real space. The arrangement, posture, movement, behavior, etc. of the game character vary in accordance with various operation inputs made by the operator (e.g. movements of line of sight and head, manual operation, voice, operation input with the game controller 5). The game character may be a virtual character or object having eyes and its type is not particularly limited. The game character may be e.g. a human male character, a human female character, a non-human animal character, a virtual creature character other than human beings and animals, or a robot other than creatures.

FIG. 4 shows an exemplary flow of a game that is executed by the control part 27 of the head mounted display 7 and the information processing device 3.

At step S5, the control part 27 determines whether the player wears the head mounted display 7 for the first time.

The control part 27 may cause the display part 13 to display thereon a message to confirm whether it is a first wear and may make a determination based on the player's input (YES or NO). If it is the first wear (step S5:YES), the procedure goes to next step S10. On the contrary, if not the first wear (step S5:NO), the procedure goes to step S15 described later.

At step S10, the control part 27 executes the line-of-sight adjustment process. The line-of-sight adjustment technique is not particularly limited. For example, the control part 27 may display markers on the display part 13 at total 5 locations, i.e. at a center location of the player's field of view and at 4 locations in the vicinity of four corners so that the dine-of-sight information is detected during when the player is gazing at the markers.

At step S15, the control part 27 displays a home menu screen on the display part 13.

At step S20, the control part 27 determines whether to start a game. For example, the control part 27 may make a determination based on whether the game is activated on the home menu screen by the player. The procedure waits at this step S20 until the game starts (step S20:NO). If the game is started (step S20:YES), the procedure goes to next step S25.

At step S25, the control part 27 executes the space recognition process of recognizing real space around the player using e.g. the depth sensors or cameras. This allows generation of a stationary static coordinate system (coordinate system corresponding to real space) that does not change even though the position of the head mounted display 7 changes as the player moves around.

At step S30, the information processing device 3 displays a virtual object on the display part 13. The virtual object is displayed e.g. at the center of the field of view of the display part 13. In the depth direction, the virtual object is displayed at a position near a collision point between the direction that the display part 13 faces (the direction of the player's head) and real space recognized at step S25. In the case that the player changes the direction of his head, the display position of the virtual object in the field of view remains unchanged from the center, whereas only the position of the virtual object in the depth direction changes in accordance with real space. The position in the depth direction may also be fixed and displayed at a preset position. The player may be able to adjust the position in the vertical and horizontal directions in the field of view or the position in the depth direction. The type of the virtual object is not particularly limited. For example, it can be a simple shaped object such as a cube, a rectangular parallelepiped, or a sphere, or a virtual object imitating various objects that actually exist such as a chair, a table, etc. A game character itself may be displayed.

At step S35, the information processing device 3 determines whether a game character is selected by the player. The control waits at this step S35 until the game character is selected (step S35:NO). If the game character is selected (step S35:YES), the procedure goes to next step S40.

FIG. 5 shows an example of a character selection screen. In the example shown in FIG. 5, rectangular parallelepiped virtual objects 33A to 33C are displayed superimposed on an image of the player's room that is real space. In this example, the virtual objects 33A to 33C are displayed e.g. in the vicinity of a sofa. The virtual objects 33A, 33B, and 33C correspond to game characters A, B, and C, respectively, and have their respective different colors. The player can switch the virtual objects 33A, 33B, and 33C in order, as shown in FIG. 5, e.g. by the tap operation described above or by a switching operation achieved through the game controller 5. The virtual objects may be switched by calling a character name aloud. With a virtual object corresponding to a desired game character being displayed, the player can select the game character e.g. by the double-tap operation or by a decision operation achieved through the game controller 5.

Referring back to FIG. 4, at step S40, the information processing device 3 determines whether the position and the orientation of the virtual object are decided by the player. The procedure waits at this step S40 until the position and the orientation of the virtual object are decided (step S40: NO). If the position and the orientation of the virtual object are decided (step S40:YES), the procedure goes to next step S45.

FIG. 6 shows an example of a position adjustment screen of a virtual object. As shown in FIG. 6, e.g. by changing the orientation of the player's head, the player can vertically and horizontally adjust the position relative to real space of the virtual object 33A that is displayed at the center of the field of view of the display part 13. Since the display position of the virtual object 33A corresponds to the display position of the game character A, the player adjusts the position of the virtual object 33A so that the game character A is arranged at a desired position.

FIG. 7 shows an example of an orientation adjustment screen of the virtual object. As shown in FIG. 7, the player can adjust the orientation of the virtual object 33A by rotating it around a vertical axis e.g. by a rotational operation made by the hand's movement described above or a rotational operation made through the game controller 5. Since the orientation of the virtual object 33A corresponds to the orientation of the game character A, the player adjusts the orientation of the virtual object 33A so that the game character A faces a desired direction.

After completing adjustment of the position and orientation of the virtual object relative to real space, the player can decide the position and orientation of the virtual object by performing the double-tap operation or the decision operation through the game controller 5.

Referring back to FIG. 4, at step S45, the information processing device 3 displays the game character such that the game character is arranged coinciding with the position and orientation of the virtual object. FIG. 8 shows an example of a display screen of a game character. In this example, a female game character 37 as the game character A is displayed e.g. in her standing posture in front of a sofa.

At step S50, the information processing device 3 executes a communication process enabling communication to be made between the player and the game character. The player can communicate with the game character in various modes. For example, by moving around in real space, the player can move around a displayed game character and view or talk to the game character from different directions.

The player can e.g. touch a game character. FIG. 9 shows an example of a game screen in the case of touching a game character. As shown in FIG. 9, an aiming line 41 is irradiated from a left hand 39 of the player. When irradiated onto a touchable area of the game character 37, the aiming line 41 changes color so that the player can identify the touchable area. By e.g. closing the left hand with the color changed, the player can touch the game character 37. At this time, the game character 37 may take an action in response to the touch, such as e.g. being pleased, blushing for shame, being displeased, or speaking given lines. In FIG. 9, the right hand of the game character 37 is irradiated with the aiming line 41. By closing the player's left hand in this state, the player can touch (hold) the right hand of the game character 37. In FIG. 9, the image of real space is not shown (the same applies to FIGS. 10 and 11 described later).

Although not shown, with the aiming line 41 irradiated onto the head of the game character 37, the player can stroke the head of the game character 37 e.g. by moving the left hand 39 so that it is substantially horizontal to the floor and then moving it in the left-right direction. At this time, the game character 37 may take an action in response to the stroke on the head, such as e.g. rejoicing, being spoiled, or uttering a voice such as "Ehehe".

In the case that the player e.g. waves his right hand toward the game character 37, the game character 37 may take an action of waving back the hand while saying a line such as "Bye bye". In the case that the player e.g. gives the game character 37 a peace sign, the game character 37 may take an action of e.g. returning a peace sign to the player while speaking a predetermined line such as "Peace!".

When the player e.g. utters "hand fan" with his right hand moved forward, the right hand switches to a hand fan mode. FIG. 10 shows an example of a game screen in the hand fan mode. As shown in FIG. 10, when the player waves (fans with) a right hand 43 toward the game character 37 in the hand fan mode, a virtual wind occurs in a direction corresponding to the direction of fanning with the right hand 43, with the result that flexible objects accompanying the game character 37, e.g. hair or clothes flutter in the wind. In FIG. 10, e.g. hair 45 of the game character 37 is fluttering in a direction corresponding to the virtual wind. At this time, the game character 37 may take an action in response to the wind blowing, such as e.g. standing ready or giving a shriek. In addition to or in place of the right hand 43, an image of the hand fan may be displayed.

When the player e.g. utters "Spray" with his right hand moved forward, the right hand switches to a spray mode. FIG. 11 shows an example of a game screen in the spray mode. As shown in FIG. 11, when in a spray mode the player e.g. bends a second joint of an index finger 47 of the right hand from the state where the index finger 47 is extended upward, a spray 49 of mist is fired at the game character 37. The spray 49 may be displayed or undisplayed. As a result, skin of the game character 37 and accompanying objects (e.g. hair, clothes, etc.) grow wet. Since the spray 49 is fired every time the index finger 47 is bent, the wet state gradually progresses and becomes drenched by repeating the spray many time. In FIG. 11, e.g. a face 51 and clothes 53 of the game character 37 are wet. At this time, the game character 37 may take an action in response to getting wet, such as e.g. standing ready, giving a scream, or getting angry.

The player may give the game character 37 a call. For example, in the case that the player calls a name, the game character 37 may make a reply. In the case that the player utters a compliment such as "cute" or "pretty", the game character 37 may be pleased or blush for shame. For example, in the case that the player utters "High cheese", the game character 37 may get into a pose for photograph such as e.g. giving a peace sign or making a smile. Otherwise, in response to various calls from the player, the game character 37 may show various facial expressions and gestures, such as laughing, getting troubled or angry, etc. or may speak lines.

Referring back to FIG. 4, step S55, it is determined whether to end the game. If the game is not over (step S55:NO), the procedure returns to step S50. On the other hand, if the game is over (step S55:YES), this flowchart comes to an end.

Although in the above, the case has been described where the game character 37 is displayed in a standing posture, display may be made such that the game character 37 is arranged coinciding with the position and orientation of the real object, e.g. such that the game character 37 is sitting on an actual chair. Details of this process will then be described.

4. First Embodiment

In the first embodiment, details will be described of the processes effected in the case that a game character is arranged coinciding with the position and orientation of a real object. The contents of processes of this embodiment are executed when mode switching is achieved e.g. by the player giving a call such as "Let's sit down" in the communication process at step S50 described hereinbefore. Although not described below, in this embodiment, the player may make various communications that have been described at step S50 with a game character, after arranging the game character coinciding with the position and orientation of the real object.

4-1. Functional Configuration of Information Processing Device

Referring first to FIG. 12, description will be given of an example of a functional configuration of the information processing device 3 according to the first embodiment. Although in FIG. 12 the configuration of the head mounted display 7 is not shown, the head mounted display 7 has the same configuration as that shown in FIG. 2 described above.

As shown in FIG. 12, the information processing device 3 includes an object selection processing part 55, an object display processing part 57, an object adjustment processing part 59, a character posture setting processing part 61, a first character display processing part 63, and an object hide processing part 65.

The object selection processing part 55 selects a kind of a virtual object, based on an input of the player. The virtual object is prepared in advance as a virtual object that imitates various real objects existing in real space. The player may be able to select a desired virtual object from among the prepared virtual objects. The virtual objects may include e.g. virtual seat object such as a chair, a sofa, a ball, a cushion, etc., virtual furniture objects such as a table, a chest, etc., virtual tableware objects such as a glass, a cup, a plate, etc. and virtual wall objects against which the game character can lean. For example, if the game character is desired to be seated on a real seat object such as a chair, a sofa, a ball, a cushion, etc. in real space, the player selects a virtual seat object.

The object display processing part 57 allows the display part 13 to display an image of the virtual object selected by the object selection processing part 55, superimposed on an image in real space.

The object adjustment processing part 59 adjusts at least one of the position or the orientation of the virtual object relative to the image in real space, based on the player's input. For example, if the game character is desired to be seated on a real seat object, the object adjustment processing part 59 adjusts at least one of the position or the orientation of the virtual seat object relative to the real seat object contained in the image in real space, based on the player's input. As described above, the player can vertically and horizontally adjust the position relative to the real space of the virtual object displayed at the center of the field of view of the display part 13, e.g. by changing the orientation of his head. The position of the virtual object in the depth direction is a position near the collision point between the direction of the player's head and the real space, as described above. The position in the depth direction along the direction of the line of sight may be adjustable e.g. by a manual operation or an operation made through the game controller 5. The player can adjust the orientation of the virtual object e.g. by the rotational operation via the hand's movement or the rotational operation made through the game controller 5. The player may adjust both the position and the orientation of the virtual object or only one of the position and the orientation.

The character posture setting processing part 61 sets the posture of a game character, based on the type of the virtual object selected by the object selection processing part 55. For example, in the case that the selected object is a virtual seat object such as a chair, a sofa, a ball, a cushion, etc., a posture to sit on is set. For example, in the case that the selected object is a virtual table object, a posture to be seated confronting the player with the virtual table object in between is set. For example, in the case that the selected object is a virtual tableware object such as a glass, a cup, a plate, etc., a posture to touch it is set. For example, in the case that the selected object is a virtual wall object, a posture to lean against the virtual wall object is set.

The first character display processing part 63 (an example of a character display processing part) causes the display part 13 to display thereon an image of a virtual game character such that it is arranged coinciding with the position or the orientation of the virtual object whose at least one of the position or the orientation is adjusted by the object adjustment processing part 59. For example, in the case that at least one of the position or the orientation of a virtual seat object is adjusted with respect to a real seat object, the first character display processing part 63 causes the display part 13 to display an image of a game character thereon so that the game character is arranged coinciding with at least one of the position or the orientation of the real seat object. The first character display processing part 63 causes the display part 13 to display thereon an image of a game character that takes a posture set by the character posture setting processing part 61.

The object hide processing part 65 hides an image of a virtual object when caused to display an image of the game character by the first character display processing part 63.

The processes, etc. effected by the processing parts described hereinabove are not limited to the example of sharing these processes. For example, they may be processed by a smaller number of processing parts (e.g. one processing part) or may be processed by further subdivided processing parts. The functions of the processing parts are implemented by a game program run by a CPU 301 (see FIG. 38 described later). However, for example, some of them may be implemented by an actual device such as a dedicated integrated circuit such as ASIC or FPGA, other electric circuits, etc. The processing parts described above are not limited to the case that all of them are mounted on the information processing device 3. Some or all of them may be mounted on the head mounted display 7 (e.g. control part 27). In such a case, the control part 27 of the head mounted display 7 acts as an example of the information processing device.

4-2. Screen Example of Virtual Object Adjustment and Character Display

Referring next to FIGS. 13 to 19, examples of a screen will be described on which the position and orientation of a virtual object are adjusted to display a game character.

In the example shown in FIG. 13, e.g. a virtual seat object 67 of a chair with backrest is being selected by the player. As shown in the upper part of FIG. 13, adjustment is made so that the orientation of the virtual seat object 67 coincides with the orientation of a real seat object 69 that is a chair with backrest existing in real space. Next, as shown in the middle part of FIG. 13, adjustment is made so that the position of the virtual seat object 67 coincides with the position of the real seat object 69. At this time, adjustment may be made so that for example, the virtual seat object 67 and the real seat object 69 coincide in seat height. The adjustments of the orientation and position may be made in the reverse order to the above, or may be made in parallel (the same applies to FIGS. 14 to 19). Subsequently, as shown in the lower part of FIG. 13, a game character 71 set to a sitting posture is arranged so as to coincide with the adjusted position and orientation of the virtual seat object 67, with the virtual seat object 67 becoming hidden. This enables the game character 71 to be displayed as if the game character 71 were sitting on the real seat object 69.

In the example shown in FIG. 14, e.g. a virtual seat object 73 of a balance ball is being selected by the player. The virtual seat object 73 is displayed together with the orientation. As shown in the upper part of FIG. 14, adjustment is made so that the orientation of the virtual seat object 73 coincides with the orientation of a real seat object 75 that is a balance ball existing in real space. In this example, the real seat object 75 is of a ball shape having no orientation. The player may therefore adjust the front of the game character to be the direction to face. Next, as shown in the middle part of FIG. 14, adjustment is made so that the position of the virtual seat object 73 coincides with the position of the real seat object 75. At this time, adjustment may be made so that for example, the virtual seat object 73 and the real seat object 75 coincide in seat (top surface) height. Subsequently, as shown in the lower part of FIG. 14, a game character 77 set to a sitting posture is arranged so as to coincide with the adjusted position and orientation of the virtual seat object 73, with the virtual seat object 73 becoming hidden. This enables the game character 77 to be displayed as if the game character 71 were sitting on the real seat object 75.

In the example shown in FIG. 15, e.g. a virtual seat object 79 of a seated cushion is being selected by the player. As shown in the upper part of FIG. 15, adjustment is made so that the orientation of the virtual seat object 79 coincides with the orientation of a real seat object 81 that is a seated cushion existing in real space. Next, as shown in the middle part of FIG. 15, adjustment is made so that the position of the virtual seat object 79 coincides with the position of the real seat object 81. At this time, adjustment may be made so that for example, the virtual seat object 79 and the real seat object 81 coincide in seat height. Subsequently, as shown in the lower part of FIG. 15, a game character 83 set to a sitting posture is arranged so as to coincide with the adjusted position and orientation of the virtual seat object 79, with the virtual seat object 79 becoming hidden. This enables the game character 83 to be displayed as if the game character 83 were sitting on the real seat object 81.

Although not shown, it is also possible for example to seat the game character on e.g. a square cushion that allows sitting in four directions, so as to face one direction in the same manner as the above and to seat the player adjacent to the game character so as to face another direction.

In the example shown in FIG. 16, e.g. a virtual object 85 of a hugging pillow is being selected by the player. As shown in the upper part of FIG. 16, adjustment is made so that the orientation of the virtual object 85 coincides with the orientation of a real object 87 that is a hugging pillow existing in real space. At this time, adjustment may be made so that for example, the virtual object 85 and the real object 87 coincide in longitudinal direction (axial direction). Next, as shown in the middle part of FIG. 16, adjustment is made so that the position of the virtual object 85 coincides with the position of the real object 87. At this time, adjustment may be made so that for example, the virtual object 85 and the real object 87 coincide in top surface height or center position. Subsequently, as shown in the lower part of FIG. 16, a game character 89 set to a posture lying and holding a pillow is arranged so as to coincide with the adjusted position and orientation of the virtual object 85, with the virtual object 85 becoming hidden. This enables the game character 89 to be displayed as if the game character 89 were hugging the real object 87.

In the example shown in FIG. 17, e.g. a virtual object 91 of a glass with a straw is being selected by the player. As shown in the upper part of FIG. 17, adjustment is made so that the orientation of the virtual object 91 coincides with the orientation of a real object 93 that is a glass with a straw existing in real space. At this time, adjustment may be made so that for example, the virtual object 91 and the real object 93 coincide in straw direction. Next, as shown in the middle part of FIG. 17, adjustment is made so that the position of the virtual object 91 coincides with the position of the real object 93. At this time, adjustment may be made so that for example, the virtual object 91 and the real object 93 coincide in straw height. Subsequently, as shown in the lower part of FIG. 17, a game character 95 set to a posture touching a glass and holding a straw in its mouth is arranged so as to coincide with the adjusted position and orientation of the virtual object 91, with the virtual object 91 becoming hidden. This enables the game character 95 to be displayed as if the game character 95 were holding the real object 93 in its hand and drinking.

In the example shown in FIG. 18, e.g. a virtual object 97 of a table is being selected by the player. As shown in the upper part of FIG. 18, adjustment is made so that the orientation of the virtual object 97 coincides with the orientation of a real object 99 that is a table existing in real space. At this time, adjustment may be made so that for example, the virtual object 97 and the real object 99 coincide in longitudinal direction. Next, as shown in the middle part of FIG. 18, adjustment is made so that the position of the virtual object 97 coincides with the position of the real object 99. At this time, adjustment may be made so that for example, the virtual object 97 and the real object 99 coincide in top surface height. Subsequently, as shown in the lower part of FIG. 18, a game character 101 set to a posture e.g. confronting the player with a table in between and putting its hands or elbows on the table is arranged so as to coincide with the adjusted position and orientation of the virtual object 97, with the virtual object 97 becoming hidden. This enables the game character 101 to be displayed as if e.g. the game character 101 were eating together with the player. By making the same adjustment for glasses, plates, etc. placed on the table, in addition to the table, it becomes possible to give a display as if the game character were drinking or eating while holding a glass, a plate, or the like in its hand. This enables the player to feel like a date.

In the example shown in FIG. 19, e.g. a virtual object 103 of a wall is being selected by the player. As shown in the upper part of FIG. 19, adjustment is made so that the orientation of the virtual object 103 coincides with the orientation of a real object 105 that is a wall existing in real space. At this time, adjustment may be made so that for example, the virtual object 103 and the real object 105 are parallel to each other. Next, as shown in the middle part of FIG. 19, adjustment is made so that the position of the virtual object 103 coincides with the position of the real object 105. At this time, adjustment may be made so that for example, the virtual object 103 and the real object 105 coincide in wall surface (position in the depth direction). Subsequently, as shown in the lower part of FIG. 19, a game character 107 set to a posture leaning against a wall is arranged so as to coincide with the adjusted position and orientation of the virtual object 103, with the virtual object 103 becoming hidden. As a result, if e.g. the player puts a right hand 109 against the wall, the player can get a feeling of banging his hand against the wall.

4-3. Process Procedure Executed by Information Processing Device

Referring next to FIG. 20, an example of a process procedure will be described that is executed by the CPU 301 of the information processing device 3 according to the first embodiment.

At step S110, the information processing device 3 allows the object selection processing part 55 to select a type of a virtual object based on an input of the player.

At step S120, the information processing device 3 allows the object display processing part 57 to display an image of the virtual object selected at step S110, superimposed on an image in real space by the display part 13.

At step S130, the information processing device 3 allows the object adjustment processing part 59 to adjust at least one of the position or the orientation relative to the image in real space of the virtual object displayed at step S120, based on an input of the player.

At step S140, the information processing device 3 allows the character posture setting processing part 61 to set the posture of the game character, based on the type of the virtual object selected at step S110.

At step S150, the information processing device 3 allows the first character display processing part 63 to cause the display part 13 to display thereon an image of the game character that takes the posture set at step S140, so as to be arranged coinciding with the position or the orientation of the virtual object adjusted at step S130.

At step S160, the information processing device 3 allows the object hide processing part 65 to hide the image of the virtual object. This ends the flowchart.

The process procedure is a mere example. At least some processes of the procedure may be deleted or changed, or other processes other than the above may be added. The order of at least some processes of the procedure may be changed. The plural processes may be integrated into a single process. For example, steps S120, S130, and S140 may be executed in the reverse order or may be executed simultaneously in parallel.

4-4. Effect of First Embodiment

As set forth hereinabove, the game program of this embodiment causes the information processing device 3 configured to perform transmission/reception of signals to/from the display part 13 configured to be attachable to the player' head to display a virtual image superimposed on an image in real space to function as: the object display processing part 57 causing the display part 13 to display an image of a virtual object; the object adjustment processing part 59 adjusting at least one of the position or the orientation of the virtual object relative to an image in real space, based on the player's input; the first character display processing part 63 causing the display part 13 to display an image of a virtual game character so as to be arranged coinciding with the adjusted at least one of the position or the orientation of the virtual object; and the object hide processing part 65 hiding the image of the virtual object when the image of the game character is displayed.

In this embodiment, an image of a virtual object is displayed superimposed on an image in real space by the display part 13, and at least one of the position or the orientation of the virtual object relative to the image in real space is adjusted by the player's input. An image of a virtual game character is displayed superimposed on the image in real space by the display part 13 so as to be arranged coinciding with the adjusted position or orientation of the virtual object, rendering the virtual object image hidden.

This enables the game character to be displayed so as to be arranged coinciding with the position and the orientation of the actual object, by adjusting the position and the orientation of the virtual object to coincide with those of the actual object existing in real space. Accordingly, it becomes possible for the player to feel as if the game character were present in real world, with the result that the player can feel as if he were sharing his experience in real world with the game character.

In this embodiment, the object adjustment processing part 59 may adjust at least one of the position or the orientation of the virtual seat object relative to the real seat object contained in the image in real space, based on the player's input, while the first character display processing part 63 may cause the display part 13 to display an image of the game character so that the game character is arranged coinciding with at least one of the position or the orientation of the real seat object.

In this case, the game character can be displayed as if it were seated on an actual real seat object existing in real space. This enables the player to communicate with e.g. a game character seated on a real chair, allowing the player to feel as if the game character were present in real world.

In this embodiment, the game program may cause the information processing device 3 to further function as the object selection processing part 55 that selects the type of the virtual object, based on the player's input.

In this case, it becomes possible for the player to select the type of the virtual object matching the type of the actual object that exists in real space. For example, in the case that a chair exists in real space, the game character can be displayed as if it were seated on the actual chair, by selecting an object of a virtual chair and adjusting the position and orientation of the object of the virtual chair so as to coincide with those of the actual chair. Hence, the player can feel more realistic as if the game character were present in real world.

In this embodiment, the game program may cause the information processing device 3 to further function as the character posture setting processing part 61 that sets the posture of a game character, based on the selected type of the virtual object. In such a case, the first character display processing part 63 may cause the display part 13 to display thereon an image of a game character taking the set posture.

In this case, the game character can be displayed taking a posture that corresponds to the type of the virtual object selected by the player. For example, in the case that the player selects an object of a glass with a straw, after taking a posture of e.g. putting its hand on the glass and holding the straw in its mouth, the game character can be displayed so as to be arranged coinciding with the position and orientation of the actual glass with a straw. The player can thus feel more realistic as if the game character were present in real world.

4-5. Modification Example of First Embodiment

In the first embodiment described above, the adjusted position and orientation of the virtual object may be registrable so that the action of the game character can be changed based on the registered contents.

FIG. 21 shows an example of a functional configuration of the information processing device 3 according to this modification example. As shown in FIG. 21, the information processing device 3 includes an object register processing part 111 and a first character action setting processing part 113, in addition to the configuration shown in FIG. 12.

The object register processing part 111 registers at least one of the position or the orientation of a virtual object adjusted by the object adjustment processing part 59, into an appropriate record medium (e.g. a RAM 305, a recording device 317, etc., see FIG. 38 described later).

The first character action setting processing part 113 (an example of a character action setting processing part) sets an action of a game character, based on the at least one of the position or the orientation of the virtual object registered by the object register processing part 111. The "action" includes a game character's movement, body motion, facial expression and gesture, utterance, etc. The first character display processing part 63 causes the display part 13 to display an image of a game character so that the game character takes the action set by the first character action setting processing part 113.

FIG. 22 shows an example of real space encompassing virtual objects to be registered. FIG. 22 is a diagram of e.g. the player' room where there are arranged a sofa 115, a table 117, a chest 119, a television 121, a calendar 123, a window 125, etc. The player selects a virtual object that corresponds to each real object, and performs the adjustment of the position and the orientation to register the type, position, orientation, etc. of each virtual object. This enables the game character to take actions in accordance with the arrangement of the furniture, etc. in the player' room. For example, the game character can take a wide variety of actions in accordance with the registered contents, such as e.g.: being seated at a place of the sofa 115; sifting in front of the television 121 to see the direction of television; putting its elbows or drinking or eating at the place of the table 117; making a motion to open a drawer in front of the chest 119; looking at the calendar 123 and saying a line such as "It's an anniversary soon"; or looking out in front of the window 125 and saying a line "It's a nice day today, isn't it?".

According to this modification example, by adjusting and registering the positions and orientations of the virtual objects e.g. in accordance with the arrangement of the furniture, etc. in his room, the player enables the game character to take actions in accordance with the arrangement of the furniture, etc. It therefore becomes possible for the player to feel as if the game character were present in his room, bringing about a feeling felt as if the player were sharing his real experience with the game character.

5. Second Embodiment

In a second embodiment, details will be described of processes effected in the case of setting the line-of-sight direction of the game character based on the line-of-sight direction of the player. The process contents of this embodiment are executed in the communication process at step S50 described above.

(5-1. Functional Configuration of Information Processing Device>

Referring first to FIG. 23, description will be given of an example of a functional configuration of the information processing device 3 according to the second embodiment. Although in FIG. 23 the configuration of the head mounted display 7 is not shown, the head mounted display 7 has the same configuration as that shown in FIG. 2 described above.

As shown in FIG. 23, the information processing device 3 includes a line-of-sight direction setting processing part 127, a second character display processing part 129, an ancillary information acquisition processing part 131, and a second character action setting processing part 133.

The line-of-sight direction setting processing part 127 sets the line-of-sight direction of a virtual game character having eyes, based on the line-of-sight direction of the player detected by the line-of-sight direction detection part 15 of the head mounted display 7. As described above, the "virtual game character having eyes" is not limited to a human being and includes e.g. a non-human animal character, a virtual creature character other than human beings and animals, and a robot other than creatures. As described above, the "line-of-sight direction of the player" is the direction including both the eye orientation and the head orientation of the player. The line-of-sight direction setting processing part 127 sets the line-of-sight direction of the game character, based on both the detected orientation of eyes and orientation of head of the plyer. The "line-of-sight direction of a game character" refers to a combined direction of eyes' orientation, head's orientation, and body's orientation of the game character.

The line-of-sight direction setting processing part 127 may set the line-of-sight direction of the game character e.g. so as to follow the detected line-of-sight direction of the player. "To follow" means, e.g. when the player and the game character confront each other (e.g. when the angle of intersection of the front direction of the player with the front direction of the game character is greater than 90 degrees), that the line-of-sight direction of the game character intersects with the line-of-sight direction of the player at a position (e.g. intermediate position) between the game character and the player. It means, e.g. when the player and the game character are side by side (e.g. when the front direction of the player and the front direction of the game character are parallel or intersect at an angle of 90 degrees or less), that the line-of-sight direction of the game character and the line-of-sight direction of the player become parallel to each other. In the case that the detected line-of-sight direction of the player is a direction corresponding to the game character, the line-of-sight direction setting processing part 127 may set the line-of-sight direction of the game character to a direction corresponding to the player.

The second character display processing part 129 (an example of the character display processing part) causes the display part 13 to display an image of the game character superimposed on an image in real space so that the game character changes its line-of-sight direction based on the line-of-sight direction of the game character set by the line-of-sight direction setting processing part 127. At this time, the second character display processing part 129 displays the image of the game character so that the game character changes its line-of-sight direction by changing at least one of the eyes' orientation, the head's orientation, the body's orientation of the game character. Hence, the game character may change its line-of-sight direction by only the eyes' orientation or may change it by: the eyes' orientation and the head's orientation; the eyes' orientation and the body's orientation; or the head's orientation and the body's orientation without changing the eyes' orientation. The game character may change its line-of-sight direction by all of the eyes' orientation, the head's orientation, and the body's orientation.

FIGS. 24 and 25 show examples of the case that the line-of-sight direction of the game character is changed following the line-of-sight direction of the player. FIGS. 24 and 25 do not show a game play screen appearing on the display part 13 but are explanatory views explaining relationships between the game character's line-of-sight direction and the player's line-of-sight direction (the same applies to FIGS. 28 and 29 described later). FIG. 24 shows examples of the case that the player and the game character confront each other. As shown in the upper part of FIG. 24, in the case that a line-of-sight direction 137 of a player 135 turns to e.g. the right when viewed from the player, a line-of-sight direction 141 of a game character 139 turns to the right when viewed from the player so as to intersect the line-of-sight direction 137 of the player 135, to follow the player's motion. As shown in the middle part of FIG. 24, in the case that the line-of-sight direction 137 of the player 135 turns to e.g. the left when viewed from the player, the line-of-sight direction 141 of the game character 139 turns to the left when viewed from the player so as to intersect the line-of-sight direction 137 of the player 135, to follow the player's motion. As shown in the lower part of FIG. 24, in the case that the line-of-sight direction 137 of the player 135 turns toward the game character 139, the line-of-sight direction 141 of the game character 139 turns toward the player 135, to look at each other.

FIG. 25 shows examples of the case that the player and the game character are side by side. As shown in the upper part of FIG. 25, in the case that the line-of-sight direction 137 of the player 135 turns to e.g. the right when viewed from the front of the player, the line-of-sight direction 141 of the game character 139 changes so as to be substantially parallel to the line-of-sight direction 137 of the player 135, to follow the player's motion. As shown in the middle part of FIG. 25, in the case that the line-of-sight direction 137 of the player 135 turns to e.g. the left when viewed from the front of the player, the line-of-sight direction 141 of the game character 139 changes so as to be substantially parallel to the line-of-sight direction 137 of the player 135, to follow the player's motion. As shown in the lower part of FIG. 25, in the case that the line-of-sight direction 137 of the player 135 turns toward the game character 139, the line-of-sight direction 141 of the game character 139 turns toward the player 135, to look at each other.

Although not shown, also in the case that the line-of-sight direction 137 of the player 135 changes to the direction of elevation or depression, the line-of-sight direction 141 of the game character 139 follows so as to intersect the line-of-sight direction 137 of the player 135. Although in the above the case has been described where the game character 139 changes its line-of-sight direction 141 by changing, e.g. the direction of its eyes, the line-of-sight direction 141 may be changed by changing the head's orientation or the body's orientation instead of or in addition to the eyes' orientation. For example, when the line-of-sight direction 137 of the player 135 changes to a small extent, the eyes' orientation of the game character may be changed. When changing to a middle extent, the head's orientation instead of or in addition to the eyes' orientation may be changed. When changing to a great extent, the body's orientation instead of or in addition to the eyes' orientation or the head's orientation may be changed.

Referring back to FIG. 23, the ancillary information acquisition processing part 131 connects through e.g. a communication device 323 (see FIG. 38 described later) to a network NW such as Internet, to acquire various types of information from the information distribution site that distribute information, a database, etc. The ancillary information acquisition processing part 131 may acquire e.g. current position information of the player based on signals from GPS satellites. The ancillary information acquisition processing part 131 may receive and acquire information detected by various sensors of the head mounted display 7 or information acquired by the information acquisition part 25. The ancillary information acquisition processing part 131 can acquire e.g. information related to date and time, weather, news, entertainment (concert and movie schedules, etc.), shopping (bargain sale, etc.), or the like.

The second character action setting processing part 133 sets an action of a game character, based on information acquired by the ancillary information acquisition processing part 131. The "action" includes the game character' movement, facial expression and gesture, utterance, etc. The second character display processing part 129 causes the display part 13 to display an image of the game character so that the game character takes the action set by the second character action setting processing part 133.

The second character action setting processing part 133 enables the game character to take e.g. the following actions. For example, by disposing a luminance sensor on the head mounted display 7, when a shooting star is seen while the player is looking up at the night sky, the game character also allows its line of sight to follow as the player changes his line-of-sight direction toward the shooting star. At this time, the shooting star may be identified based on detection information of the luminance sensor, and the game character may utter a line in accordance with the situation, such as "The stars are beautiful!", "There was a shooting star again!", etc. Similarly, while the player is watching fireworks, the game character also allows its line of sight to follow as the player changes his line-of-sight direction toward the fireworks. At this time, the fireworks may be identified based on detection information of the luminance sensor, and the game character may utter a line in accordance with the situation, such as "The fireworks are beautiful!", etc.

For example, when a house chime rings, the game character also allows its line of sight to follow as the player changes his line-of-sight direction toward the entrance. At this time, sound of the chime may be identified based on detection information obtained by the audio input part 19, and the game character may utter a line in accordance with the situation, such as "Looks like someone is here".

By combining plural pieces of acquired information together, more advanced communication can be achieved between the player and the game character. For example, by adding time zone information to the detection information of the luminance sensor, it can be determined whether the light is the sun's light or the star's light. By further adding the current position information from GPS and the line-of-sight direction information to the detection information of the luminance sensor and the time zone information, it is also possible to determine which constellation the starlight comes from. This enables the game character to tell e.g. a story about the constellation.

In the case that e.g. news distribution information in accordance with the current position information is acquired to get e.g. coupon information that can be used at a nearby shop, and further when the player makes an utterance like "I'm hungry", the contents of the utterance may be identified based on the detection information of the audio input part 19, allowing the game character to make a proposal like "The lunch there is cheap".

In the case that e.g. the current position information is about a movie theater, e.g. show schedule information of the movie theater may be acquired to identify a currently playing movie so that if it is a horror movie, the game character can be scared or if it is a comedy movie, the game character can laugh. This enables the player to get a feeling like enjoying a movie together with the game character.

By acquiring the current position information when watching fireworks described above, it becomes possible to identify the location of the firework display and tell e.g. a story about the firework display.

The processes, etc. effected by the processing parts described hereinabove are not limited to the example of sharing these processes. For example, they may be processed by a smaller number of processing parts (e.g. one processing part) or may be processed by further subdivided processing parts. The functions of the processing parts are implemented by a game program run the CPU 301 (see FIG. 38 described later). However, for example, some of them may be implemented by an actual device such as a dedicated integrated circuit such as ASIC or FPGA, other electric circuits, etc. The processing parts described above are not limited to the case that all of them are mounted on the information processing device 3. Some or all of them may be mounted on the head mounted display 7 (e.g. control part 27). In such a case, the control part 27 of the head mounted display 7 acts as an example of the information processing device.

5-2. Process Procedure Executed by Information Processing Device

Referring then to FIG. 26, an example of a process procedure will be described that is executed when setting and changing the line-of-sight direction of the game character based on the player's line-of-sight direction by the CPU 301 of the information processing device 3 according to the second embodiment.

At step S210, the information processing device 3 acquires information on the player's line-of-sight direction detected by the line-of-sight direction detection part 15 of the head mounted display 7.

At step S220, by the line-of-sight direction setting processing part 127, the information processing device 3 sets the line-of-sight direction of a game character based on the player's line-of-sight direction.

At step S230, by the second character display processing part 129, the information processing device 3 causes the display part 13 to display an image of the game character so that the game character changes its line-of-sight direction based on the line-of-sight direction of the game character set at step S220. This flowchart thus comes to an end.

The process procedure is a mere example. At least some processes of the procedure may be deleted or changed, or other processes other than the above may be added. The order of at least some processes of the procedure may be changed. The plural processes may be integrated into a single process.

5-3. Effect of Second Embodiment

As set forth hereinabove, the game program of this embodiment causes the information processing device 3 configured to perform transmission/reception of signals to/from the display part 13 configured to be attachable to the player' head to display a virtual image superimposed on an image in real space and the line-of-sight direction detection part 15 detecting the player's line-of-sight direction to function as: the line-of-sight direction setting processing part 127 setting the line-of-sight direction of a virtual game character having eyes, based on the detected player's line-of-sight direction; and the second character display processing part 129 causing the display part 13 to display an image of the game character so that the game character changes its line-of-sight direction based on the set line-of-sight direction of the game character.

In this embodiment, the line-of-sight direction of a game character is set based on the player's line-of-sight direction. An image of the game character is generated so that the game character changes its line-of-sight direction to the set direction. The generated image is displayed superimposed on an image in real space by the display part 13. As a result, in the case that the player changes his line-of-sight direction in response to an event in real world, the line-of-sight direction of the game character can be changed so as to follow the change. The player can thus feel as if he were sharing his experience in real world with the game character.

In this embodiment, the line-of-sight direction setting processing part 127 may set the line-of-sight direction of the game character so as to follow the detected player's line-of-sight direction.

In this case, when the player changes his line-of-sight direction in response to an event in real world, the line-of-sight direction of the game character can be changed so as to follow the line-of-sight direction. This enables the player to feel as if he were watching the same thing in real world together with the game character, increasing the sense of sharing.

In this embodiment, when the detected player's line-of-sight direction is a direction corresponding to the game character, the line-of-sight direction setting processing part 127 may set the line-of-sight direction of the game character to a direction corresponding to the player.

In this case, e.g. when the player sees toward the game character while changing the line-of-sight direction of the game character so as to follow the player's line-of-sight direction, the game character also toward the player, making it possible to gaze at each other and produce a feeling of lover and date.

In this embodiment, the second character display processing part 129 may display an image of the game character so that the game character changes its line-of-sight direction by changing at least one of the eyes' orientation, the head's orientation, or the body's orientation of the game character.

In this case, when the set line-of-sight direction of the game character changes to a small extent, the eyes' orientation may be changed. When changing to a middle extent, the head's orientation instead of or in addition to the eyes' orientation may be changed. When changing to a great extent, the body's orientation instead of or in addition to the eyes' orientation or the head's orientation may be changed. In this manner, by changing the mode of motion of changing the line-of-sight direction of the game character in accordance with the extent of change of the set line-of-sight direction of the game character, more natural expression becomes possible.

5-4. Modification Example of Second Embodiment

In the second embodiment described above, in the case of allowing the line-of-sight direction of the game character to follow the player's line-of-sight direction, the face of the game character may easily be visible to the player.

FIG. 27 shows an example of a functional configuration of the information processing device 3 according to this modification example. As shown in FIG. 27, the information processing device 3 includes a time difference setting processing part 143 in addition to the configuration shown in FIG. 23 described above.

The time difference setting processing part 143 sets a predetermined time difference between the change of the player's line-of-sight direction and the change of the line-of-sight direction of the game character in the case that the player's line-of-sight direction detected by the line-of-sight direction detection part 15 of the head mounted display 7 changes from a direction not corresponding to the game character to a direction corresponding to the game character. The "predetermined time difference" may be set to e.g. approx. 1 sec to several sec.

FIG. 28 shows examples of changes of the line-of-sight direction of a game character and the player's line-of-sight direction occurring when a time difference is set in the case that e.g. the player and the game character are side by side. As shown in the upper part of FIG. 28, in the case that the line-of-sight direction 137 of the player 135 turns to e.g. the right when viewed from the front of the player, the line-of-sight direction 141 of the game character 139 changes so as to be substantially parallel to the line-of-sight direction 137 of the player 135, to follow the player's motion. Next, as shown in the middle part of FIG. 28, in the case that the line-of-sight direction 137 of the player 135 turns toward the game character 139, the line-of-sight direction 141 of the game character 139 does not change during the time difference set by the time difference setting processing part 143. Then, after the elapse of the time difference, as shown in the lower part of FIG. 28, the line-of-sight direction 141 of the game character 139 turns toward the player 135, gaging at each other.

According to this modification example, in the case that e.g. the player looks toward the game character while changing the line-of-sight direction of the game character so as to follow the player's line-of-sight direction, the game character looks toward the player after the elapse of the predetermined time difference. This enables the player to see and check, for a while, the appearance of the game character looking at the same thing as himself together, making it possible to further enhance the player's feeling of sharing the experience in real world with the game character.

In addition to the techniques, e.g. the line-of-sight direction setting processing part 127 may set the line-of-sight direction of the game character, based on either the player's eyes' orientation or head's orientation detected by the line-of-sight direction detection part 15 of the head mounted display 7, e.g. based on the head's orientation.

FIG. 29 shows examples of changes of the line-of-sight direction of the game character and the player's line-of-sight direction in this case. As shown in the upper part of FIG. 29, in the case that a head's orientation 137a of the player 135 turns to e.g. the right when viewed from the front of the player, the line-of-sight direction 141 of the game character 139 changes so as to be substantially parallel to the head's orientation 137*a* of the player 135, to follow the player's motion. Next, as shown in the lower part of FIG. 29, in the case that the player 135 turns only his eyes' orientation 137*b* toward the game character 139 without changing the head's orientation 137*a*, the line-of-sight direction 141 of the game character 139 does not change. This enables the player to visually recognize the appearance of the game character 139 looking at the same thing as himself together, by changing only his eyes' orientation.

According to this modification example, the line-of-sight direction of the game character can be changed so as to follow e.g. only the head's orientation of the player. In this manner, by separately detecting the eyes' orientation and head's orientation of the player to control the line-of-sight direction of the game character, the player can perform a so-called "flickering" action of changing only the eyes' orientation to see and check the appearance of the game character while e.g. allowing the line-of-sight direction of the game character to follow the head's orientation of the player, making it possible to further enhance the player's feeling of sharing the experience in real world with the game character.

6. Third Embodiment

In a third embodiment, description will be given of the case that wind conditions are detected in real space around the player to change the form of deformation of flexible objects (e.g. hair, clothes, etc.) accompanying the game character in accordance with the detected wind conditions. The process contents of this embodiment is executed in the communication process at step S50 described above. For example, it may be executed when switching to the hand fan mode.

6-1. Functional Configuration of Information Processing Device

Referring first to FIG. 30, description will be given of examples of a configuration of the head mounted display 7 and a functional configuration of the information processing device 3, according to the third embodiment. Although the head mounted display 7 has the same configuration as that in FIG. 2 described above in addition to the configuration shown in FIG. 30, the same configuration as in FIG. 2 is not shown.

As shown in FIG. 30, the head mounted display 7 includes a wind detection part 145. The wind detection part 145 detects wind conditions in real space around the player. The wind detection part 145 detects, as the "wind conditions", at least one of air flow, wind velocity, or wind direction. The wind detection part 145 may be disposed on any one of a front surface, side surfaces, and a rear surface, or may be disposed on a plurality of locations. The wind detection part 145 may be disposed integrally with the head mounted display 7, or may be disposed as a discrete element so as to be capable of transmission/reception of signals.

The wind detection part 145 includes an air flow detection part 147, a wind velocity detection part 149, and a wind direction detection part 151. The air flow detection part 147 is e.g. an air flow meter and detects an air flow around the player. The wind velocity detection part 149 is e.g. an anemometer and detects a wind velocity around the player. The wind direction detection part 151 is e.g. an anemoscope and detects a wind direction around the player. The air flow detection part 147, the wind velocity detection part 149, and the wind direction detection part 151 need not be separate elements. For example, like a wind direction anemometer, two or more detection parts may be integrally assembled.

The information processing device 3 includes a third character display processing part 153, an object deformation processing part 155, a third character action setting processing part 157, the ancillary information acquisition processing part 131.

The third character display processing part 153 (an example of the character display processing part) causes the display part 13 to display a virtual game character superimposed on an image in real space.

The object deformation processing part 155 changes the form of deformation of a flexible object accompanying the game character, based on the wind conditions (at least one of the air flow, the wind velocity, or the wind direction) detected by the wind detection part 145 of the head mounted display 7. The "flexible object" is e.g. hair of the game character, or clothes, swimwear, etc. worn by the game character. In the case that the game character is a female character, it may include a part of body, such as bust. The "form of deformation" is e.g. the extent of deformation, the direction of deformation, sway, vibration, turn, etc. In the case that the flexible object is e.g. clothes, swimwear, etc., it may include tear, damage, coming apart, etc.

The third character action setting processing part 157 (an example of the character action setting processing part) sets an action of a game character so as to change based on the wind conditions (at least one of the air flow, the wind velocity, or the wind direction) detected by the wind detection part 145 of the head mounted display 7. The third character display processing part 153 causes the display part 13 to display an image of the game character so that the game character takes the action set by the third character action setting processing part 157.

The ancillary information acquisition processing part 131 is the same as that of the second embodiment, and therefore will not be again described. The third character action setting processing part 157 sets an action of the game character, based on information acquired by the ancillary information acquisition processing part 131. The third character display processing part 153 causes the display part 13 to display an image so that the game character takes the action set by the third character action setting processing part 157.

FIGS. 31 and 32 show examples of the game screen in this embodiment. The example shown in FIG. 31 is the case where an event creating a wind around the player occurs in real world, with the strength of the wind being relatively weak. Although the event creating a wind is not particularly limited, it is e.g. fanning with a player's hand or a hand fan, exhaling through mouth, feeling a wind from an electric fan, blowing a wind of a hairdryer, getting some outside air, etc. In the case of the fanning motion, exhaling, blowing a dryer's wind, etc., the wind detection part 145 may be disposed as a discrete element separately from the head mounted display 7 so as to be able to detect those winds. As shown in FIG. 31, hair 161 of a game character 159 is fluttering along the direction of the wind. At this time, the game character 159 may be allowed to say a line such as "It's cool and comfortable!" in accordance with the strength of the wind.

The example shown in FIG. 32 is the case where an event creating a wind around the player occurs in real world, with the strength of the wind being relatively strong. As shown in FIG. 32, hair 161 of the game character 159 is greatly fluttering and a skirt 163 is turning up. At this time, the game character 159 may take an action such as holding down the skirt 163 with a shriek, being ashamed, etc.

By setting the action based on information acquired by the ancillary information acquisition processing part 131, more advanced communication can be achieved between the player and the game character. For example, in the case shown in FIG. 31, it may be identified that it is summer from the calendar information and that the wind is from the electric fan from the camera image or the player's voice, so that a line such as "Fan is a must in the summer!" may be uttered. It may be identified to be near the sea at night based on the time zone information and GPS current position information, with the result that a line such as "The sea breeze at night is comfortable!" may be uttered. For example, in FIG. 32, it may be identified that a typhoon is approaching based on the weather information, whereupon a line such as "Typhoon is coming here!" may be uttered.

The processes, etc. effected by the processing parts described hereinabove are not limited to the example of sharing these processes. For example, they may be processed by a less number of processing parts (e.g. a single processing part) or may be processed by further subdivided processing parts. The functions of the processing parts are implemented by a game program executed by the CPU 301 (see FIG. 38 described later). However, for example, some of them may be implemented by an actual device such as a dedicated integrated circuit such as ASIC or FPGA, other electric circuits, etc. The processing parts described above are not limited to the case that all of them are mounted on the information processing device 3. Some or all of them may be mounted on the head mounted display 7 (e.g. control part 27). In such a case, the control part 27 of the head mounted display 7 serves as an example of the information processing device.

6-2. Process Procedure Executed by Information Processing Device

Referring then to FIG. 33, an example of a process procedure will be described that is executed when the form of deformation or the action of a flexible object accompanying the game character is changed in accordance with the detected wind conditions, by the CPU of the information processing device 3 according to the third embodiment.

At step S310, by the third character display processing part 153, the information processing device 3 displays on the display part 13 an image of a virtual game character superimposed on an image in real space.

At step S320, the information processing device 3 acquires information (at least one of the air flow, the wind velocity, or the wind direction) related to the wind conditions in real space around the player detected by the wind detection part 145 of the head mounted display 7.

At step S330, by the object deformation processing part 155, the information processing device 3 sets the form of deformation of a flexible object accompanying a game character so as to change based on the wind conditions acquired at step S320, while by the third character display processing part 153, the information processing device 3 causes the display part 13 to display an image of the flexible object so that the flexible object makes the set deformation.

At step S340, by the third character action setting processing part 157, the information processing device 3 sets the action of the game character so as to change based on the wind conditions acquired at step S320, while by the third character display processing part 153, the information processing device 3 causes the display part 13 to display an image of the game character so that the game character makes the set action. This flowchart thus comes to an end.

The process procedure is a mere example. At least some processes of the procedure may be deleted or changed, or other processes other than the above may be added. The order of at least some processes of the procedure may be changed. The plural processes may be integrated into a single process.

6-3. Effect of Third Embodiment

As set forth hereinabove, the game program of this embodiment causes the information processing device 3 configured to perform transmission/reception of signals to/from the display part 13 configured to be attachable to the player' head to display a virtual image superimposed on an image in real space and the wind detection part 145 detecting the wind conditions in real space around the player to function as: the third character display processing part 153 causing the display part 13 to display an image of a virtual game character; and the object deformation processing part 155 changing the form of deformation of a flexible object accompanying the game character based on the detected wind conditions.

In this embodiment, the image of the virtual game character is displayed superimposed on the image in real space by the display part 13. At that time, the wind conditions in real space around the player are detected and the form of deformation of the flexible object accompanying the game character changes in accordance with the detected wind conditions.

As a result, in the case that an event creating a wind occurs in real world, the form of deformation of e.g. hair, clothes, etc. of the game character can be changed in accordance with the strength or the direction of the wind. For example, if the strength of the wind is strong, the hair may greatly flutter along the wind direction with the skirt turned up, whereas if the strength of the wind is weak, only the hair may flutter. The player can therefore feel as if he were sharing the experience in real world with the game character.

In this embodiment, the game program may cause the information processing device 3 to serve further as the third character action setting processing part 157 that sets the action of the game character so as to change based on the detected wind conditions. In such a case, the third character display processing part 153 may cause the display part 13 to display an image of the game character so that the game character takes the set action.

In this case, when an event creating a wind occurs in real world, the action of the game character can be changed in accordance with the conditions of the wind. For example, if the strength of the wind is strong, the game character can take an action such as holding down its skirt with a shriek, being ashamed, etc., whereas if the strength of the wind is weak, the game character can say a line such as "It's cool and comfortable!". The player can thus feel more realistic as if he were sharing the experience in real world with the game character.

In this embodiment, the wind detection part 145 may detect at least one of the air flow, the wind velocity, or the wind direction around the player, and the object deformation processing part 155 may change the form of deformation of the flexible object based on the detected at least one of the air flow, the wind velocity, or the wind direction.

In this case, when an event creating a wind occurs in real world, the form of deformation (including the direction of deformation) of e.g. hair, clothes, etc. of the game character can be changed in accordance with not only the strength (air flow and wind velocity) of the wind but also the wind direction. For example, if the air flow or the wind velocity is high, the hair may greatly flutter along the wind direction with the skirt turned over in the direction corresponding to the wind direction, whereas if the air flow or the wind velocity is low, only the hair may flutter along the wind direction. The player can therefore feel as if he were sharing the experience in real world with the game character.

7. Fourth Embodiment

In a fourth embodiment, details will be described of processes effected in the case of detecting a humidity in real space around the player to change the wet condition of an object (hair, clothes, etc.) accompanying a game character or skin of the game character in accordance with the detected humidity. The contents of processes of this embodiment are executed in the communication process at step S50 described above. For example, the process contents may be executed when having switched to the spray mode.

7.1. Functional Configuration of Information Processing Device

Referring first to FIG. 34, description will be given of examples of a configuration of the head mounted display 7 and a functional configuration of the information processing device 3, according to the fourth embodiment. Although the head mounted display 7 has the same configuration as that in FIG. 2 described above in addition to the configuration shown in FIG. 34, the same configuration as in FIG. 2 is not shown.

As shown in FIG. 34, the head mounted display 7 includes a humidity detection part 165 and a temperature detection part 167. The humidity detection part 165 is e.g. a hygrometer and detects a humidity in real space around the player. The temperature detection part 167 is e.g. a thermometer and detects a temperature in real space around the player. The humidity detection part 165 and the temperature detection part 167 may be disposed on any one of the front surface, side surfaces, and rear surface of the head mounted display 7 or may be disposed on a plurality of locations. The humidity detection part 165 and the temperature detection part 167 may be disposed integrally with the head mounted display 7 or may be disposed as discrete units so as to be capable of transmission/reception of signals. Only one of the humidity detection part 165 and the temperature detection part 167 may be disposed instead of disposing both of them.

The information processing device 3 includes a fourth character display processing part 169, a wetting process execution processing part 171, a sweating process execution processing part 173, a fourth character action setting processing part 175, and the ancillary information acquisition processing part 131.

The fourth character display processing part 169 (an example of the character display processing part) causes the display part 13 to display an image of a virtual game character superimposed on an image in real space.

The wetting process execution processing part 171 executes a wetting process so that the wet condition changes on an object accompanying a game character or skin of the game character based on the humidity detected by the humidity detection part 165 of the head mounted display 7. The "skin of the game character" includes facial skin and body skin of the game character. The "object accompanying a game character" is e.g. hair of the game character, clothes or swimwear that the game character wears, etc. The wetting process may be carried out such that wet condition (e.g. wet level, wet range, etc.) and see-through condition (e.g. see-through level, see-through range, etc.) of clothes change in accordance with the humidity level. For example, when the humidity is high, skin and hair of the game character may get drenched, or clothes the game character is wearing may get wet and transparent. When the humidity is low, skin and hair of the game character may get a little wet with the clothes remaining not transparent. In addition to the wetting process, the degree of flushing of the game character's face may be changed in accordance with the humidity level.

The sweating process execution processing part 173 executes a sweating process so that the sweat condition changes on the game character's skin based on the temperature detected by the temperature detection part 167 of the head mounted display 7. The sweating process may be carried out such that the amount of sweat, sweating area, etc. change in accordance with the temperature level. For example, when the temperature is low, the game character may be set not to sweat or sweat a little in a limited area. When the temperature is high, the game character may be set to sweat a lot over a wide area. In addition to the sweating process, the degree of flushing of the game character's face may be changed in accordance with the temperature level.

The fourth character action setting processing part 175 (an example of the character action setting processing part) sets the action of the game character so as to change based on at least one of the humidity and the temperature detected respectively by the humidity detection part 165 and the temperature detection part 167 of the head mounted display 7. The fourth character display processing part 169 causes the display part 13 to display an image of the game character so that the game character takes the action set by the fourth character action setting processing part 175.

The ancillary information acquisition processing part 131 is the same as that of the second embodiment described above and hence will not be again described. The fourth character action setting processing part 175 sets the action of the game character based on information acquired by the ancillary information acquisition processing part 131. The fourth character display processing part 169 causes the display part 13 to display an image of the game character so that the game character takes the action set by the fourth character action setting processing part 175.

FIGS. 35 and 36 show examples of game screens in this embodiment. The example shown in FIG. 35 is the case where an event increasing the humidity occurs around the player in real world, with the humidity being a relatively high. The event increasing the humidity is not particularly limited. For example, it includes spraying with a sprayer, hosing, sprinkling a shower, and being exposed to rain. In the case of the spraying, hosing, sprinkling, etc., the humidity detection part 165 may be disposed as a discrete element separately from the head mounted display 7 so as to be able to detect a change in humidity. In the example shown in FIG. 35, a face 179, hair 181, clothes 183, etc. of a game character 177 are drenched. At this time, the game character 177 may utter a line in accordance with the humidity, such as "I got wet in the rain".

The example shown in FIG. 36 is the case where an event increasing the temperature occurs around the player in real world, with the temperature being relatively high. As shown in FIG. 36, a face 187 of a game character 185 flushes and sweats, while the game character 185 is taking an action of wiping her face with a handkerchief 189. At this time, the game character 185 may utter a line in accordance with the temperature, such as "It's really hot today".

By setting the action based on information acquired by the ancillary information acquisition processing part 131, more advanced communication can be achieved between the player and the game character. For example, in the case shown in FIG. 35, it may be identified that it is hosing from the camera image or voice of the player, and the game character may be angry saying a line such as "I got drenched!". It may be identified that it is evening shower from the time zone information and the weather information, allowing the game character to say a line such as "I got caught in evening shower". In FIG. 36, it may be identified that the season is summer based on the calendar information, allowing the game character to say a line such as "It's really hot this summer".

Although in this embodiment the case has been described where both the humidity and the temperature are detected, one of them need not necessarily be detected. Only the humidity or only the temperature may be detected to execute processes that are based on the result of detection thereof.

The processes, etc. effected by the processing parts described hereinabove are not limited to the example of sharing these processes. For example, they may be processed by a less number of processing parts (e.g. a single processing part) or may be processed by further subdivided processing parts. The functions of the processing parts are implemented by a game program executed by the CPU 301 (see FIG. 38 described later). However, for example, some of them may be implemented by an actual device such as a dedicated integrated circuit such as ASIC or FPGA, other electric circuits, etc. The processing parts described above are not limited to the case that all of them are mounted on the information processing device 3. Some or all of them may be mounted on the head mounted display 7 (e.g. control part 27). In such a case, the control part 27 of the head mounted display 7 serves as an example of the information processing device.

7-2. Process Procedure Executed by Information Processing Device

Referring then to FIG. 37, an example of a process procedure will be described that is executed when the wet condition or the sweat condition of skin of a game character or an object accompanying the game character is changed in accordance with the detected humidity or temperature, by the CPU of the information processing device 3 according to the fourth embodiment.

At step S410, by the fourth character display processing part 169, the information processing device 3 displays on the display part 13 an image of a virtual game character superimposed on an image in real space.

At step S420, the information processing device 3 acquires information related to the humidity or the temperature in real space around the player detected by the humidity detection part 165 and the temperature detection part 167 of the head mounted display 7.

At step S430, by the wetting process execution processing part 171, the information processing device 3 executes the wetting process so that the wet condition changes on skin of a game character or on an object accompanying the game character based on the humidity detected by the humidity detection part 165 of the head mounted display 7, to thereby display the resultant image on the display part 13.

At step S440, by the sweating process execution processing part 173, the information processing device 3 executes the sweating process so that the sweat condition changes on skin of the game character based on the temperature detected by the temperature detection part 167 of the head mounted display 7, to thereby display the resultant image on the display part 13.

At step S450, by the fourth character action setting processing part 175, the information processing device 3 sets the action of the game character so as to change based on the humidity and the temperature detected respectively by the humidity detection part 165 and the temperature detection part 167 of the head mounted display 7. By the fourth character display processing part 169, the information processing device 3 then causes the display part 13 to display an image of the game character so that the game character takes the set action. This flowchart thus comes to an end.

The process procedure is a mere example. At least some processes of the procedure may be deleted or changed, or other processes other than the above may be added. The order of at least some processes of the procedure may be changed. The plural processes may be integrated into a single process. Although in this embodiment the case has been described where both the humidity and the temperature are detected, one of them need not necessarily be detected. Only the humidity or only the temperature may be detected to execute processes that are based on the result of detection thereof. In the case of detecting only the humidity, step S440 is excluded, whereas when detecting only the temperature, step S430 becomes unnecessary.

7-3. Effect of Fourth Embodiment

As set forth hereinabove, the game program of this embodiment causes the information processing device 3 configured to perform transmission/reception of signals to/from the display part 13 configured to be attachable to the player' head to display a virtual image superimposed on an image in real space and the humidity detection part 165 detecting the humidity in real space around the player to function as: the fourth character display processing part 169 causing the display part 13 to display an image of a virtual game character; and the wetting process execution processing part 171 executing the wetting process so that the wet condition changes on skin of a game character or on an object accompanying the game character based on the detected humidity.

In this embodiment, the image of the virtual game character is displayed superimposed on the image in real space by the display part 13. At that time, the humidity in real space around the player is detected and the wet condition of skin of the game character or the object accompanying the game character changes in accordance with the detected humidity.

As a result, in the case that e.g. an event of creasing the humidity occurs in real world, the wet condition of e.g. skin of the game character or of e.g. hair, clothes, etc. can be changed in accordance with the humidity level. For example, processes become possible where when the humidity is high, skin and hair get drenched or clothes grow transparent whereas when the humidity is low, skin and hair get a little wet with the clothes remaining not transparent. The player can therefore feel as if he were sharing the experience in real world with the game character.

In this embodiment, the game program may cause the information processing device 3 to serve further as the fourth character action setting processing part 175 that sets the action of the game character so as to change based on the detected humidity. In such a case, the fourth character display processing part 169 may cause the display part 13 to display an image of the game character so that the game character takes the set action.

In this case, if e.g. an event increasing the humidity occurs in real world, the action of the game character can be changed in accordance with the humidity level. For example, when the humidity is high, the clothes may grow transparent inducing shame with a shriek, whereas when the humidity is low, only skin may get wet leading to a line such as "It's cool and comfortable!". The player can thus feel more realistic as if he were sharing the experience in real world with the game character.

In this embodiment, the game program may cause the information processing device 3 to serve further as the sweating process execution processing part 173 executing the sweating process so that the sweat condition changes on skin of the game character based on the detected temperature.

In this case, if e.g. an event increasing the temperature (e.g. taking a walk during daytime in summer) occurs in real world, the sweat condition of skin of the game character can be changed in accordance with the temperature level. The player can thus feel more realistic as if he were sharing the experience in real world with the game character.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

8. Hardware Configuration of The Information Processing Device

An exemplary hardware configuration will be described for the information processing device 3 achieving the processing parts implemented by a program executed by the CPU 301 described above, with reference to FIG. 38. The control part 27 of the head mounted display 7 may be have the same hardware configuration.

As shown in FIG. 38, the information processing device 3 has the circuitry including a CPU 301, a ROM 303, a RAM 305, a GPU 306, a dedicated integrated circuit 307 constructed for specific use such as an ASIC or an FPGA, an input device 313, an output device 315, a storage device 317, a drive 319, a connection port 321, and a communication device 323. These constituent elements are mutually connected via a bus 309 and an input/output (I/O) interface 311 such that signals can be transferred.

The game program can be recorded in a ROM 303, the RAM 305, and the storage device 317 such as an hard disk device, for example.

The game program can also temporarily or permanently (non-transitory) be recorded in a removable recording medium 325 such as magnetic disks including flexible disks, various optical disks including CDs, MO disks, and DVDs, and semiconductor memories. The recording medium 325 as described above can be provided as so-called packaged software. In this case, the game program recorded in the recording medium 325 may be read by the drive 319 and recorded in the storage device 317 through the I/O interface 311, the bus 309, etc.

The game program may be recorded in, for example, a download site, another computer, or another recording medium (not shown). In this case, the game program is transferred through a network NW such as a LAN or the Internet and the communication device 323 receives this program. The program received by the communication device 323 may be recorded in the storage device 317 through the I/O interface 311, the bus 309, etc.

The game program may be recorded in appropriate external connection device 327, for example. In this case, the game program may be transferred through the appropriate connection port 321 and recorded in the storage device 317 through the I/O interface 311, the bus 309, etc.

The CPU 301 executes various process in accordance with the program recorded in the storage device 317 to implement the object selection processing part 55, the object display processing part 57, the object adjustment processing part 59, the character posture setting processing part 61, the first character display processing part 63, the object hide processing part 65, the object register processing part 111, the first character action setting processing part 113, the line-of-sight direction setting processing part 127, the second character display processing part 129, the ancillary information acquisition processing part 131, the second character action setting processing part 133, the time difference setting processing part 143, the third character display processing part 153, the object deformation processing part 155, the third character action setting processing part 157, the fourth character display processing part 169, the wetting process execution processing part 171, the sweating process execution processing part 173, and the fourth character action setting processing part 175, etc. In this case, the CPU 301 may directly read and execute the program from the storage device 317 or may be execute the program once loaded in the RAM 305. In the case that the CPU 301 receives the program through, for example, the communication device 323, the drive 319, or the connection port 321, the CPU 301 may directly execute the received program without recording in the storage device 117.

The CPU 301 may execute various processes based on a signal or information input from the input device 313 such as the game controller 5 described above, a mouse, a keyboard, and a microphone as needed.

The GPU 306 executes processes for displaying images such as a rendering processing based on a command of the CPU 301.

The CPU 301 and the GPU 306 may output a result of execution of the process from the output device 315 such as the display part 13 of the head mounted display 7, for example. And the CPU 301 and the GPU 306 may transmit this process result to the communication device 323 or the connection port 321 as needed or may record the process result into the storage device 317 or the recording medium 325.

What is claimed is:

1. A game processing method executed by an information processing device configured to perform transmission/reception of signals to/from a display part configured to be attachable to a head of a player to display a virtual image superimposed on an image of real space, the method comprising:

causing the display part to display an image of a virtual object;
   adjusting at least one of a position or an orientation of the image of the virtual object so that the position and the orientation of the image of the virtual object coincides with a position and an orientation of an image of a real object contained in the image of real space by superimposing the image of the virtual object on the image of the real object, based on an input of the player;

causing the display part to display an image of a virtual game character so as to be arranged coinciding with the adjusted at least one of the position or the orientation of the image of the virtual object; and hiding the image of the virtual object when the image of the virtual game character is displayed.

2. The game processing method according to claim 1, wherein the adjusting at least one of a position or an orientation of the image of the virtual object comprises adjusting at least one of the position or the orientation of the image of the virtual object relative to an image of a real seat object contained in the image of real space, based on an input of the player, and wherein the causing the display part to display an image of a virtual game character comprises causing the display part to display the image of the virtual game character so that the image of the virtual game character is arranged being in the posture to sit on the image of the real seat object and coinciding with a position and an orientation of the image of the real seat object.

3. The game processing method according to claim 1, further comprising:

selecting a type of the virtual object, based on an input of the player.

4. The game processing method according to claim 3, further comprising:

setting a posture of the virtual game character, based on the selected type of the virtual object, wherein the causing the display part to display an image of a virtual game character comprises causing the display part to display an image of the virtual game character taking the set posture.

5. The game processing method according to claim 1, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

6. The game processing method according to claim 2, further comprising:

selecting a type of the virtual object, based on an input of the player.

7. The game processing method according to claim 6, further comprising:

setting a posture of the virtual game character, based on the selected type of the virtual object, wherein the causing the display part to display an image of a virtual game character comprises causing the display part to display an image of the virtual game character taking the set posture.

8. The game processing method according to claim 2, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

9. The game processing method according to claim 3, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

10. The game processing method according to claim 4, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

11. The game processing method according to claim 6, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

12. The game processing method according to claim 7, further comprising:

registering the adjusted at least one of the position or the orientation of the virtual object; and setting an action of the virtual game character, based on the registered at least one of the position or the orientation of the virtual object, wherein the causing the display part to display an image of a virtual game character comprises causing the display part to display an image of the virtual game character so that the virtual game character takes the set action.

13. A non-transitory recording medium readable by an information processing device configured to perform transmission/reception of signals to/from a display part configured to be attachable to a head of a player to display a virtual image superimposed on an image of real space, the recording medium storing a game program programmed to cause the information processing device to:

cause the display part to display an image of a virtual object;

adjust at least one of a position or an orientation of the image of the virtual object so that the position and the orientation of the image of the virtual object coincides with a position and an orientation of an image of a real object contained in the image of real space by superimposing the image of the virtual object on the image of the real object, based on an input of the player;

cause the display part to display an image of a virtual game character so as to be arranged coinciding with the adjusted at least one of the position or the orientation of the image of the virtual object; and hide the image of the virtual object when the image of the virtual game character is displayed.

14. The non-transitory recording medium readable by an information processing device according to claim 13, wherein the adjusting at least one of a position or an orientation of the image of the virtual object comprises adjusting at least one of the position or the orientation of the image of the virtual object relative to an image of a real seat object contained in the image of real space, based on an input of the player, and wherein the causing the display part to display an image of a virtual game character comprises causing the display part to display the image of the virtual game character so that the image of the virtual game character is arranged being in the posture to sit on the image of the real seat object and coinciding with a position and an orientation of the image of the real seat object.

15. The non-transitory recording medium readable by an information processing device according to claim 13, the recording medium storing the game program further programmed to cause the information processing device to:

select a type of the virtual object, based on an input of the player.

16. The non-transitory recording medium readable by an information processing device according to claim 15, the recording medium storing the game program further programmed to cause the information processing device to:

set a posture of the virtual game character, based on the selected type of the virtual object, wherein the causing the display part to display an image of a virtual game character comprises causing the display part to display an image of the virtual game character taking the set posture.

17. The non-transitory recording medium readable by an information processing device according to claim 13, the recording medium storing the game program further programmed to cause the information processing device to:

register the adjusted at least one of the position or the orientation of the virtual object; and set an action of the virtual game character, based on the registered at least one of the position or the orientation of the virtual object, wherein the causing the display part to display an image of a virtual game character comprises causing the display part to display an image of the virtual game character so that the virtual game character takes the set action.

18. The non-transitory recording medium readable by an information processing device according to claim 14, the recording medium storing the game program further programmed to cause the information processing device to:

select a type of the virtual object, based on an input of the player.

19. The non-transitory recording medium readable by an information processing device according to claim 18, the recording medium storing the game program further programmed to cause the information processing device to:

set a posture of the virtual game character, based on the selected type of the virtual object, wherein the causing the display part to display an image of a virtual game character comprises causing the display part to display an image of the virtual game character taking the set posture.

20. The non-transitory recording medium readable by an information processing device according to claim 14, the recording medium storing the game program further programmed to cause the information processing device to:

register the adjusted at least one of the position or the orientation of the virtual object; and set an action of the virtual game character, based on the registered at least one of the position or the orientation of the virtual object, wherein the causing the display part to display an image of a virtual game character comprises causing the display part to display an image of the virtual game character so that the virtual game character takes the set action.

* * * * *